United States Patent
Morioka

(10) Patent No.: US 6,674,706 B1
(45) Date of Patent: Jan. 6, 2004

(54) INFORMATION REPRODUCING APPARATUS AND INFORMATION RECORDING MEDIUM

(75) Inventor: Ryuichiro Morioka, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 643 days.

(21) Appl. No.: 09/608,962

(22) Filed: Jun. 30, 2000

(30) Foreign Application Priority Data

Jul. 2, 1999 (JP) .......................................... P11-189611

(51) Int. Cl.[7] .................................................. G11B 7/00
(52) U.S. Cl. .............................. 369/59.21; 369/124.05; 369/47.17
(58) Field of Search ........................... 369/53.33, 53.35, 369/53.36, 59.21, 59.22, 124.05, 44.26, 44.34, 44.41, 47.17, 47.35, 47.46, 53.11, 53.12, 53.31, 53.41, 53.42, 59.11, 59.2, 59.25, 59.26

(56) References Cited

U.S. PATENT DOCUMENTS

| | | | | |
|---|---|---|---|---|
| 5,901,128 A | * | 5/1999 | Hayashi et al. | ........ 369/124.05 |
| 6,304,538 B1 | * | 10/2001 | Hayashi | ................... 369/59.22 |
| 6,359,848 B1 | * | 3/2002 | Van Den Enden | ....... 369/59.21 |
| 6,552,988 B1 | * | 4/2003 | Nishiwaki et al. | ........ 369/59.22 |

FOREIGN PATENT DOCUMENTS

JP 6-76303 3/1994

* cited by examiner

Primary Examiner—Thang V. Tran
Assistant Examiner—Bach Vuong
(74) Attorney, Agent, or Firm—Morgan, Lewis & Bockius LLP

(57) ABSTRACT

On an information recording medium (1), digital information is multi-level-recorded by changing a shape of an information pit in correspondence with the digital information by multiple steps. An information reproducing apparatus (S) for reproducing the digital information from the information recording medium is provided with: a detection signal generating device (2a) for generating an analog detection signal corresponding to the information pit; a sampling device (2b) for sampling the generated analog detection signal at a sampling cycle corresponding to a cycle, at which the information pit is formed on the information recording medium, to thereby generate a sampling detection signal; an extracting device (3, 9) for extracting a level fluctuating component, which is included in the analog detection signal, out of the generated sampling detection signal; a first subtraction signal generating device (3, 12) for subtracting the extracted level fluctuating component from the generated sampling detection signal, to thereby generate a first subtraction signal; and a reproducing device (5) for reproducing the digital information on the basis of the generated first subtraction signal.

9 Claims, 16 Drawing Sheets

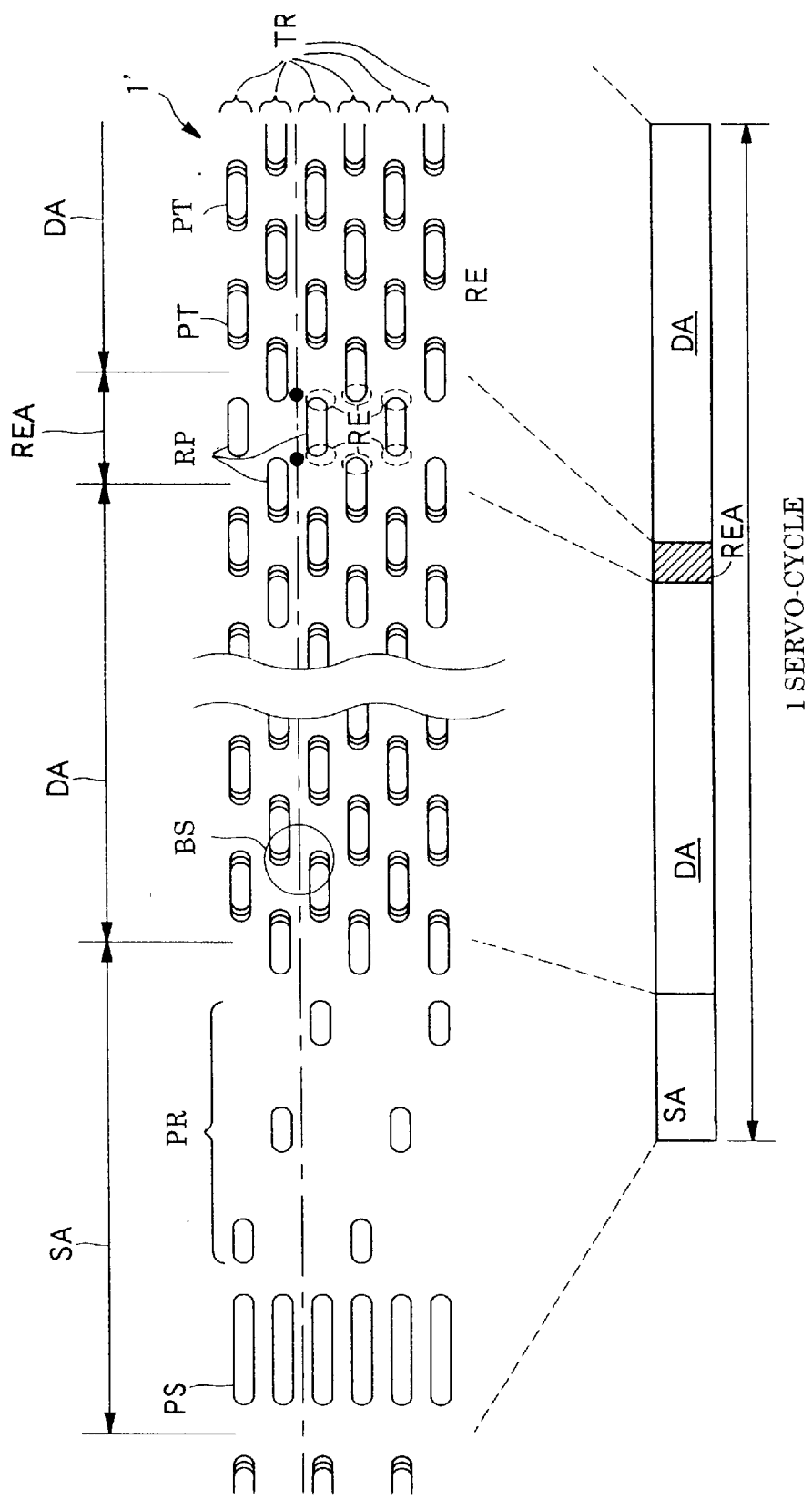

Sap

Spp
(x(t))

Spe
(y(t))

INFORMATION REPRODUCING APPARATUS AND INFORMATION RECORDING MEDIUM

BACKGROUND OF THE INVENTION

1. Field of the Invention

The present invention relates to an information reproducing apparatus and an information recording medium, and more particularly relates to an information recording medium in which a shape of an information pit is changed by multiple steps in accordance with a value of digital information to be recorded and accordingly the digital information is multi-level-recorded, and an information reproducing apparatus for reproducing the digital information, which is multi-level-recorded, from the information recording medium.

2. Description of the Related Art

There is a research with regard to a technique for recording or reproducing multi-value digital information having a plurality of values in addition to "0" or "1" onto or from an information recording medium in order to record or reproduce a large amount of digital information onto or from an optical disc as an information recording medium at a high density.

As a conventional technique in this field, an information recording and reproducing method employing a so-called "pit edge multi-level recording and reproducing method" is known. This multi-level recording and reproducing method is to record the digital information by changing a position of an edge (implying both ends of an information pit of an optical disc existing in a rotation direction thereof, and hereafter implying the same) of the information pit formed at a certain cycle on a track on an information record surface of the optical disc, by multiple steps in the rotation direction in accordance with a value of the digital information to be recorded, and to reproduce the digital information recorded in this manner from the information record surface of the optical disc. For example, the information recording and reproducing method employing this pit edge multi-level recording and reproducing method is disclosed in detail in Japanese Patent Application Laid Open No. Hei.6-76303.

Here, at a time of reproduction in the pit edge multi-level recording and reproducing method, a reproduction light beam is irradiated with respect to the pit edge of the optical disc, on which the digital information is multi-level-recorded by changing the position of the pit edge by multiple steps. Then, a multiple level judgment using a plurality of preset thresholds is performed with respect to an analog detection signal obtained by receiving the reflection light from the pit. Accordingly, the digital information is reproduced.

Next, the operation at a time of reproduction in the pit edge multi-level recording and reproducing method will be described below with reference to FIG. 14. FIG. 14 is a diagram describing the operation in which the digital information is reproduced by irradiating a reproduction light beam to only one track at a time.

As shown on a top stage of FIG. 14, in the conventional pit edge multi-level recording method, an information pit row is constituted by information pits PT on a track TR at a constant cycle, and a position of a pit edge at each information pit PT is changed, for example, by three steps (in case that the digital information has a multi-level of three values) in a rotation direction of the optical disc, in accordance with the above-mentioned value of the digital information. In addition, on the top stage of FIG. 14, the positions that can be considered as the position of the pit edge in each information pit PT are all shown by using solid lines. However, a pit edge is actually formed at any one position among those three pit edge positions (similarly in FIG. 15 described later).

On the other hand, when the reproduction light beam is irradiated with respect to only one track at a time to thereby reproduce the digital information, the light beam irradiated to the optical disc generates a beam spot BS having an irradiation range indicated by a circle on the top stage of FIG. 14. Then, since this beam spot BS is moved on the track TR indicated by a solid line, it is possible to sequentially read the digital information that is multi-level-recorded in one pit edge.

At this time, one track signal indicative of a position of the information pit on the optical disc (in other words, a positional relation between a land area in which the information pit is not formed and an area in which the information pit is formed) is alternately changed between a positive area (indicative of a range of the information pit) and a negative area (indicative of a range of the land area) in accordance with a position of each pit edge, as shown on a second stage from the top stage of FIG. 14. Also, a beam profile indicative of a change of an irradiation strength of the light beam with the beam spot BS on the optical disc as a center has the distribution as shown on a second stage from a bottom stage of FIG. 14.

When the light beam is irradiated in the manner as shown on the top stage to the second stage from the bottom stage of FIG. 14, an analog detection signal detected on the basis of the reflection light has a waveform as shown on the bottom stage of FIG. 14. At this time, a waveform of the analog detection signal corresponds to a waveform, in which the waveform indicative of the beam profile and the one track signal are multiplied by each other.

Incidentally, the bottom stage of FIG. 14 shows a plurality of kinds of waveforms having the possibility that they may be detected as the analog detection signal in such a way that all of them overlap with each other. However, the actual analog detection signal has one waveform among those waveforms shown on the bottom stage of FIG. 14. Moreover, the bottom stage of FIG. 14 shows the case that a level of the analog detection signal is made higher when the information pit PT is read in (similarly in FIG. 15 as described later).

At this time, as shown on the bottom stage of FIG. 14, an output analog detection signal is separated into multiple levels corresponding to the positions of the pit edge, at a timing corresponding to an average change point from the information pit to the land area or from the land area to the information pit (this phenomenon is typically referred to as an "Eye Open"). Then, the analog detection signal ise sampled at the timing corresponding to this average change point. Moreover, the sampled values are threshold-judged on the basis of the two thresholds shown on the bottom stage of FIG. 14. Accordingly, the value of the digital information recorded in each pit edge is recovered/reproduced.

According to such a pit edge multi-level recording and reproducing method, the digital information can be recorded or reproduced at a density higher than that of the conventional case of recording or reproducing the digital information in which only "0" and "1" are used as their values.

However, in the above-mentioned conventional pit edge multi-level recording and reproducing method of example, if an angle between an optical axis of the reproduction light beam and an information record surface on which the information pit PT is formed is deviated from a right angle because of deflection or distortion of the optical disc (hereafter, this drift is referred to as a "tilt drift"), the shape of the beam spot BS formed on the information record surface of the optical disc is deformed to thereby mix a level fluctuation component into the analog detection signal at the time of the reproduction. Moreover, if the analog detection signal is threshold-judged as mentioned above in the condition that the level fluctuation component is mixed, this leads to a problem that an error is induced in the judged result.

That is, as shown in FIG. 15, when the tilt drift causes the shape of the beam spot BS formed, on the information record surface to be deformed (e.g., elliptically deformed in FIG. 15), the symmetry with a line passing through the central point of the beam spot BS in the beam profile as a symmetric axis is destroyed (refer to the second stage from the bottom stage of FIG. 14 and a second stage from a bottom stage of FIG. 15). Thus, the waveform of the analog detection signal resulting from the product of the waveform indicative of the beam profile and the one track signal contains the level fluctuation component as shown on the bottom stage of FIG. 15.

Actually, the deformation of the symmetry in the beam profile causes the deformation of a linear phase property in a phase transmission performance of a reproduction system in the pit edge multi-level recording and reproducing method. So, the phase transmission performance contains the phase fluctuation. As a result, a position of an average zero-crossing point of the actual analog detection signal is deviated from an original position so that the level fluctuation component is included in even the sample value corresponding to its sampling timing.

Then, the change of the values when the analog detection signals in this condition are sampled at the sampling timing equal to that of the case shown in FIG. 14 is undulated uprightly and downwardly as compared with the case of FIG. 14, as shown on the bottom stage of FIG. 15.

Thus, if the sampled values containing those undulations are threshold-judged in accordance with the threshold similar to that of the case of FIG. 14, a judgment value is outputted which is different from a value of the digital information actually recorded in a corresponding pit edge. Accordingly, this results in an occurrence of a so-called "decode error".

By the way, it is confirmed by the inventor of the present invention that the undulation caused by the level fluctuation component contained in the analog detection signal has a larger influence on the increase of the recovery error as compared with a so-called "intra-code interference" that is typically included at the time of the reproduction of the digital information.

SUMMARY OF THE INVENTION

The present invention is proposed in view of the above mentioned problems. It is therefore an object of the present invention to provide an information reproducing apparatus and an information recording medium, which can cancel out an influence of a level fluctuation component included in a generated analog signal to thereby accurately reproduce digital information, when the digital information is reproduced from an information recording medium on which the digital information is multi-level-recorded even if such a level fluctuation component is contained in the generated analog detection signal.

The above object of the present invention can be achieved by an information reproducing apparatus for reproducing digital information from an information recording medium such as an optical disc etc., on which the digital information is multi-level-recorded by changing a shape of an information pit in, correspondence with the digital information by multiple steps. The information reproducing apparatus is provided with: a detection signal generating device such as a light receiving unit etc., for generating an analog detection signal corresponding to the information pit; a sampling device such as an A/D converter etc., for sampling the generate analog detection signal at a sampling cycle corresponding to a cycle, at which the information pit is formed on the information recording medium, to thereby generate a sampling detection signal; an extracting device such as a shift register etc., for extracting a level fluctuating component, which is included in the analog detection signal, out of the generated sampling detection signal; a first subtraction signal generating device such as a subtracter etc., for subtracting the extracted level fluctuation component from the generated sampling detection signal, to thereby generate a first subtraction signal; and a reproducing device such as a decoder etc., for reproducing the digital information on the basis of the generated first subtraction signal.

According to the information reproducing apparatus of the present invention, when reproducing the multi-level-recorded digital information, since the level fluctuating component included in the corresponding analog signal is extracted and cancelled out, it is possible to accurately reproduce the multi-level-recorded digital information.

Therefore, even if the positional drift or the like at the time of forming the information pit occurs, which may cause the level fluctuating component, it is possible to reproduce the digital information accurately while canceling the evil effect of such a positional drift or the like.

In one aspect of the information reproducing apparatus of the present invention, the digital information is multi-level-recorded on the information recording medium by changing respective positions of two edges opposite to each other of each information pit, by multiple steps in correspondence with the digital information. The detection signal generating device is provided with: an irradiating device such as a reproducing head etc., for irradiating a reproducing light beam to reproduce the digital information onto one track, which is formed of a plurality of information pits on the information recording medium; and a light receiving device for receiving a reflection light of the reproducing light beam from each of the information pits, to thereby generate the analog detection signal. The level fluctuating component is included in the analog detection signal caused by a drift from a right angle of an angle between (i) an information recording surface, on which the information pit is formed, of the information recording medium and (ii) an optical axis of the reproducing light beam. The reproducing device reproduces the digital information by comparing a level of the first subtraction signal with a plurality of thresholds set in advance in accordance with multiple levels in multi-level recording of the digital information.

According to the information reproducing apparatus of the present invention, even if the level fluctuating component is included in the corresponding analog signal due to a drift of the angle between (i) an information recording surface of the information record medium and (ii) the optical axis of the reproducing light beam, from a right angle, it is possible to optically reproduce the multi-level-recorded digital information accurately.

In this aspect of the information reproducing apparatus of the present invention, the extracting device may be provided with: a shift register device such as a shift register etc., for sequentially delaying the generated sampling detection signal for each sampling cycle, to thereby output a delay signal respectively for each delay of one sampling cycle; an inverting device such as a shift register etc., for inverting even-numbered delay signals among delay signals outputted from the shift register device, to thereby generate inverted delay signals; an adding device such as an adder etc., for adding (i) odd-numbered delay signals among the delay signals outputted from the shift register device and (ii) the inverted delay signals respectively to each other, to thereby generate an addition signal; and a level signal generating device such as a divider etc., for dividing a level of the addition signal by the number of delay stages in the shift register device, to thereby generate a level signal indicative of a level of the level fluctuating component. The first subtraction signal generating device subtracts the generated level signal from the generated sampling detection signal, to thereby generate the first subtraction signal.

Accordingly, since the amplitude variation of the analog detection signal, which is caused by a mixture of the level fluctuating component into the analog detection signal, is averaged and reduced by the feed forward control, it is possible to accurately reproduce the multi-level-recorded digital information while canceling the level fluctuating component.

In this case, the number of delay stages in the shift register device may be an even number.

Accordingly, it is possible to prevent the detection accuracy from being deteriorated due to a direct current component generated in the process of averaging the amplitude variation of the analog detection signal.

Alternatively, in this one aspect of the information reproducing apparatus of the present invention, the extracting device may be provided with: an adding device such as an adder etc., for adding (i) the generated sampling detection signal and (ii) a multiplied delay signal, to thereby generate an addition signal; a delaying device such as a delay etc., for delaying the generated addition signal by one sampling cycle, to thereby generate a delay signal; a multiplying device such as a multiplier etc., for multiplying the generated delay signal by a multiplication coefficient, which is set in advance to have a value greater than −1, to thereby generate and output the multiplied delay signal to the adding device; and a level signal generating device such as a multiplier etc., for multiplying the generated addition signal by an addition coefficient, which has a value that one is added to the multiplication coefficient, to thereby generate a level signal indicative of a level of the level fluctuating component. The first subtraction signal generating device subtracts the generated level signal from the generated sampling detection signal, to thereby generate the first subtraction signal.

Accordingly, since the amplitude variation of the analog detection signal generated by the mixture of the level fluctuating component into the analog detection signal can be averaged and reduced by the feed forward control without employing the shift register device or the like, it is possible to simply and accurately reproduce the digital information while eliminating the level fluctuating component.

Alternatively, in this one aspect of the information reproducing apparatus of the present invention, the extracting device may be provided with: a second subtraction signal generating device such as a subtracter etc., for subtracting a delay signal form the generated first subtraction signal, to thereby generate a second subtraction signal; a delaying device such as a delay etc., for delaying the generated second subtraction signal by one sampling cycle, to thereby generate and output the delay signal to the second subtraction signal generating device; and a level signal generating device such as a multiplier etc., for multiplying the generated second subtraction signal by a multiplication coefficient, which has a value less than 1, to thereby generate a level signal indicative of a level of the level fluctuating component. The first subtraction signal generating device subtracts the generated level signal from the generated sampling detection signal, to thereby generate and output the first subtraction signal to the reproducing device and the second subtraction signal generating device.

Accordingly, since the amplitude variation of the analog detection signal generated by the mixture of the level fluctuating component into the analog detection signal can be averaged and reduced by the feed back control without employing the shift register device or the like, it is possible to simply and accurately reproduce the digital information while eliminating the level fluctuating component.

In another aspect of the information reproducing apparatus of the present invention, the digital information is multi-level-recorded on the information recording medium by changing respective positions of two edges opposite to each other of each information pit, by multiple steps in correspondence with the digital information. A plurality of information pits are formed in a zigzag shape between two tracks adjacent to each other, as for a plurality of tracks formed of the information pits on the information recording medium. The detection signal generating device is provided with: an irradiating device for irradiating a reproducing light beam to reproduce the digital information onto the information recording medium such that an irradiation range of the reproducing light beam includes a plurality of edges on the tracks adjacent to each other; and a light receiving device for receiving a reflection light of the reproducing light beam from each of the edges on the tracks, to thereby generate the analog detection signal. The level fluctuating component is included in the analog detection signal caused by a drift of a position, where each information pit is formed, from a position corresponding to the cycle by which the information pit is to be formed. The reproducing device reproduces the digital information by comparing a level of the first subtraction signal with a plurality of thresholds set in advance in accordance with multiple levels in multi-level recording of the digital information.

According to this aspect, even if the level fluctuating component is included in the analog detection signal due to the positional drift or the like, it is possible to optically reproduce the digital information accurately.

In this another aspect of the information reproducing apparatus of the present invention, the information recording medium may comprise the information pits having standard edges, which are the edges each formed at a position corresponding to a standard level set in advance for the multiple levels and which are included simultaneously in the irradiation range. The extracting device may be provided with: a second subtraction signal generating device such as a subtracter etc., for subtracting a delay signal form the generated first subtraction signal, which is generated at a timing when only the standard edges are included in the irradiation range, to thereby generate a second subtraction signal; a delaying device such as a delay etc., for delaying the generated second subtraction signal by one sampling cycle, to thereby generate and output the delay signal to the second subtraction signal generating device; and a level signal generating device such as a multiplier etc., for multiplying the generated delay signal by a multiplication coefficient, which has a value less than 1, to thereby generate a level signal indicative of a level of the level fluctuating component. The first subtraction signal generating device may subtract the generated level signal from the generated sampling detection signal, to thereby generate and output the first subtraction signal to the reproducing device and the second subtraction signal generating device.

Accordingly, since the amplitude variation of the analog detection signal caused by the mixture of the level fluctuating component into the analog detection signal is averaged and reduced by the feed back control, on the basis of the subtraction signal corresponding to the standard pit, even if the digital information recorded on the edges striding over a plurality of tracks is reproduced simultaneously, it is possible to accurately reproduce the digital information while eliminating the level fluctuating component.

Alternatively, in this another aspect of the information reproducing apparatus of the present invention, the information recording medium may comprise the information pits having standard edges, which are the edges each formed at a position corresponding to a standard level set in advance for the multiple levels and which are included simultaneously in the irradiation range. The standard edge may be formed to be included in the irradiation range at two irradiation timings respectively corresponding to a start timing and an end timing of one sampling cycle. The extracting device may be provided with: a first delaying device such as a delay etc., for delaying the first subtraction signal, which is generated at a former irradiation timing of the two irradiation timings, by one sampling cycle, to thereby generate a first delay signal; a second subtraction signal generating device such as a subtracter etc., for subtracting the first delay signal from the first subtraction signal, which is generated at a latter irradiation timing of the two irradiation timings, to thereby generate a second subtraction signal; a third subtraction signal generating device such as a subtracter etc., for subtracting a second delay signal form the second subtraction signal corresponding to the latter irradiation timing, to thereby generate a third subtraction signal; a second delaying device such as a delay etc., for delaying the generated third subtraction signal by one sampling cycle, to thereby generate the second delay signal; and a level signal generating device such as a multiplier etc., for multiplying the generated second delay signal by a multiplication coefficient, which is set in advance to have a value greater than −1, to thereby generate a level signal indicative of a level of the level fluctuating component. The first subtraction signal generating device may subtract the generated level signal from the generated sampling detection signal, to thereby generate and output the first subtraction signal to the reproducing device, the first delaying device and the second subtraction signal generating device.

Accordingly, since the amplitude variation of the analog detection signal caused by the mixture of the level fluctuating component into the analog detection signal is averaged and reduced by the feed back control, on the basis of the subtraction signal generated at the sampling timing corresponding to the standard pit, even if the digital information recorded on the edges striding over a plurality of tracks is reproduced simultaneously, it is possible to accurately reproduce the digital information while eliminating the level fluctuating component.

The above object of the present invention can be also achieved by an information recording medium, on which digital information having multiple levels is multi-level-recorded by changing a shape of information pit by multiple steps in accordance with the digital information, wherein the information pit is shaped in a zigzag shape between two tracks adjacent to each other, each track being formed of a plurality of information pits on the information recording medium, positions of two edges opposed to each other of each information pit are respectively changed by multiple steps in correspondence with the multiple levels, the information pits have standard edges respectively, which are formed at positions corresponding to a standard level set in advance in the multiple levels and are included simultaneously in an irradiation range of a light beam to reproduce the digital information on the information recording medium, and the digital information is reproduced from the information recording medium by detecting the standard edges by using the light beam while a level fluctuating component included in an analog detection signal corresponding to the information pit is cancelled out.

According to the information recording medium of the present invention, since the level fluctuating component is eliminated by detecting the standard edge, even if the level fluctuating component is included in the analog detection signal, it is possible to optically reproduce the multi-level-recorded digital information accurately.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is an enlarged plan view showing a pit array of an optical disc according to fourth and fifth embodiments of the present invention;

DETAILED DESCRIPTION OF THE PREFERRED EMBODIMENTS

Preferred embodiments of the present invention will be explained below with reference to the drawings. The following respective embodiments are the embodiment in which the present invention is applied to an information reproducing apparatus for reproducing digital information from an optical disc serving as an information recording medium on which the digital information is multi-level recorded.

Figure 1:
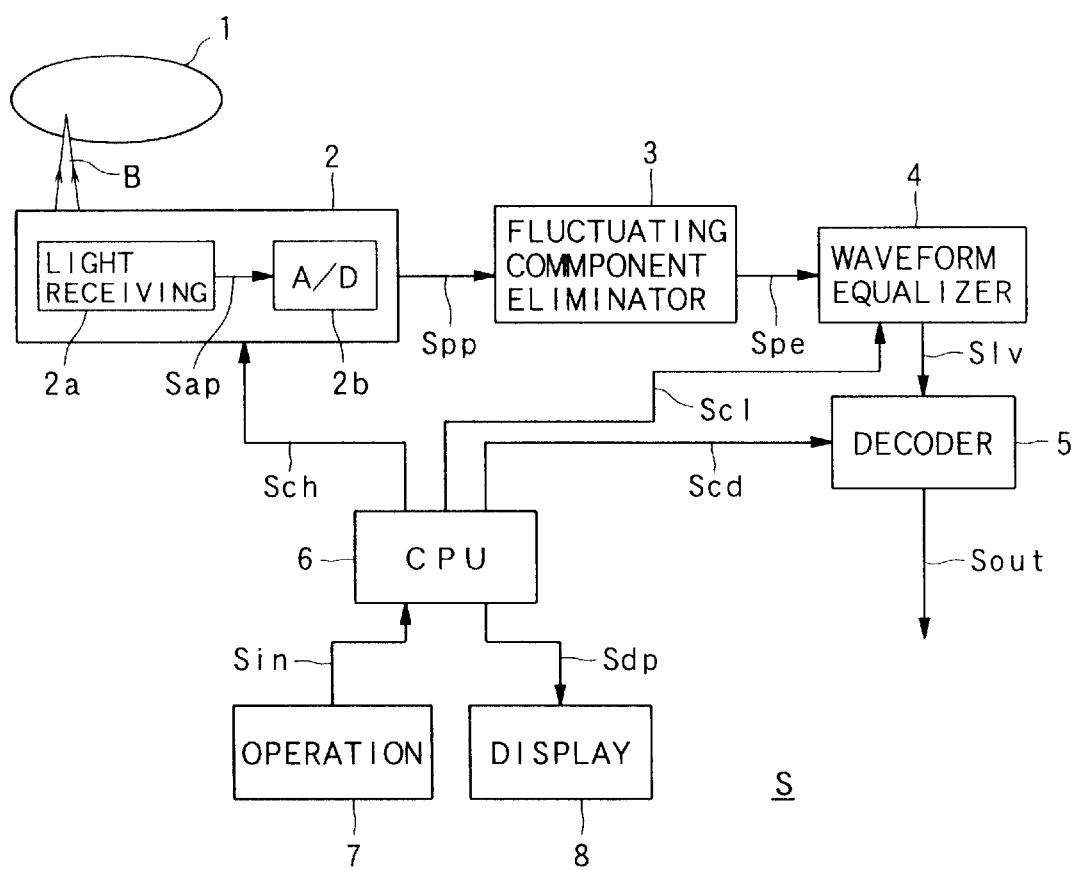
FIG. 1 is a block diagram showing a schematic configuration of an information reproducing apparatus according to first to third embodiments of the present invention.

(I) Whole Configuration of Information Reproducing Apparatus According to First to Third Embodiments At first, the whole configuration and operation of the information reproducing apparatus having a fluctuation component eliminator in later-described first to third embodiments is described with reference to FIG. 1. FIG. 1 is a block diagram showing the schematic configuration of the information reproducing apparatus having the fluctuation component eliminator according to the first to third embodiments.

As shown in FIG. 1, an information reproducing apparatus S having a fluctuation component eliminator according to the first to third embodiments is provided with a reproducing head 2 serving as an irradiating unit, a fluctuation component eliminator 3 according to the present invention, a waveform equalizer 4, a decoder 5 serving as a reproducing unit, a CPU 6, an operation unit 7 and a display unit 8.

Also, the reproducing head 2 is provided with a light receiving unit 2a serving as a detection signal generating unit and a light receiving unit, and an A/D (Analog/Digital) converter 2b serving as a sampling unit.

Next, the whole operation is described below.

In accordance with a control signal Sch from the CPU 6, the reproducing head 2 drives a semiconductor laser (not shown) or the like, and then irradiates a reproduction light beam B having a certain light intensity onto an optical disc 1 on which the digital information is multi-level-recorded. On the basis of the reflection light from the optical disc 1, the light receiving unit 2a generates an analog detection signal Sap corresponding to the digital information carried in each information pit. Then, the analog detection signal Sap is sampled at a predetermined sampling cycle by using the A/D converter 2b. Thus, an input sample Spp corresponding to the digital information is generated and is outputted to the fluctuation component eliminator 3.

Then, the fluctuation component eliminator 3 eliminates a level fluctuation component (e.g., undulation of each sample value in the input sample Spp in the case of FIG. 15) included in the input sample Spp by using later-described respective operations, and then generates a fluctuation eliminated sample Spe, and further outputs it to the waveform equalizer 4.

Then, the waveform equalizer 4 performs a so-called waveform equalizing process (i.e., a waveform re-shaping process) on the fluctuation eliminated sample Spe, in accordance with a control signal Scl from the CPU 6, and generates a waveform equalized sample Slv, and then outputs it to the decoder 5.

Accordingly, the decoder 5 compares a level of the waveform equalized sample Slv with a plurality of preset thresholds, in accordance with a control signal Scd from the CPU 6, and generates a threshold sample indicative of the digital information on the optical disc 1, and also decodes the threshold sample by using a decoding method corresponding to an encoding method of the digital information recorded on the optical disc 1. Then, the decoder 5 generates a decode data Sout in which the digital information is reproduced, and further outputs it to an external display or speaker or the like.

In parallel with those processes, in order to control the whole operation of the information reproducing apparatus S, the CPU 6 generates the respective control signals Sch, Scl and Scd, and outputs them to the respective constitutional elements.

At this time, the actuation for a user to instruct various operations of the information reproducing apparatus S is executed by the operation unit 7. So, the operation unit 7 generates an actuation signal Sin corresponding to the actuation. The CPU 6 recognizes the content of the actuation signal Sin to thereby generate the respective control signals Sch, Scl and Scd in order to control the respective constitutional elements so as to satisfy the operation.

An information indicative of an operation state of the information reproducing apparatus S is outputted from the CPU 6 to the display unit 8 as a display signal Sdp. Then, the operation state is displayed by the execution of a displaying operation corresponding to the display signal Sdp.

(11-A) First Embodiment of Fluctuation Component Eliminator

Figure 2A:
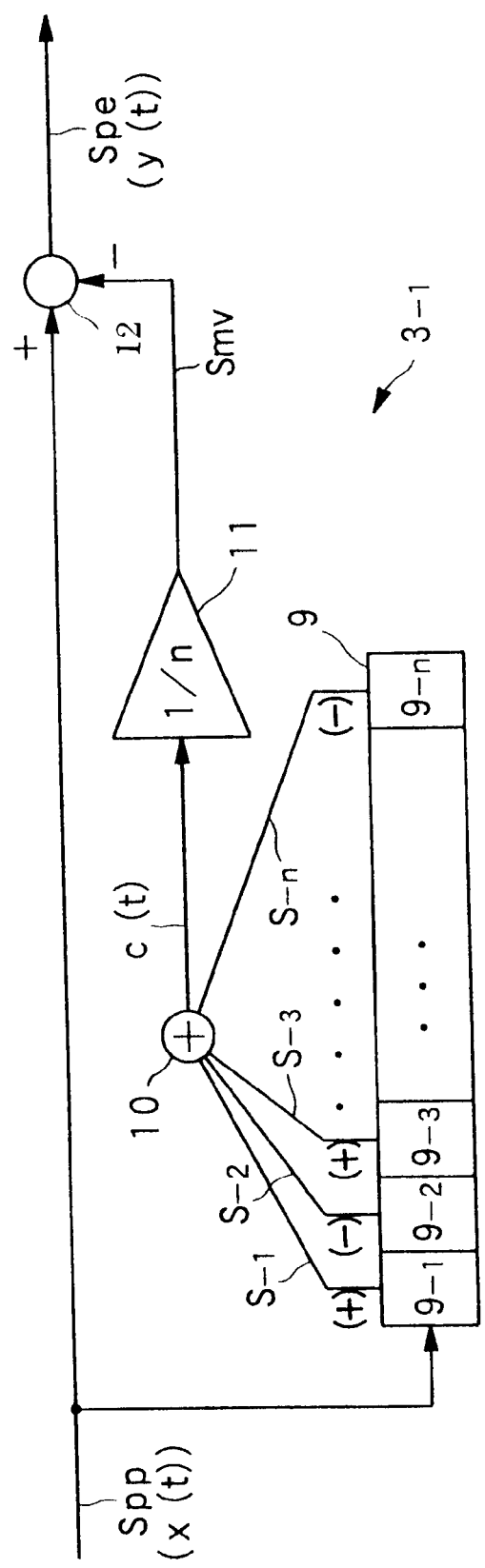
FIG. 2A is a block diagram showing a configuration of a fluctuation component eliminator in the first embodiment.
Figure 2B:
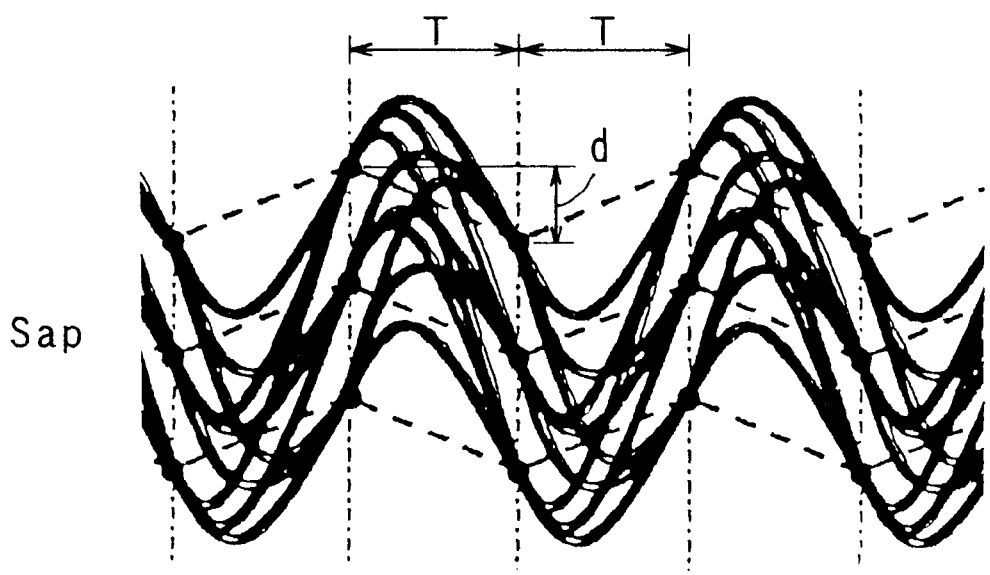
FIG. 2B is a timing chart showing an operation of the fluctuation component eliminator in the first embodiment.

The first embodiment of the fluctuation component eliminator 3 according to the present invention will be described below with reference to FIG. 2A and FIG. 2B. FIG. 2A is a block diagram showing the detailed configuration of a fluctuation component eliminator $3_{-1}$ according to the first embodiment, and FIG. 2B is a diagram showing a waveform explaining the operation of the fluctuation component eliminator $3_{-1}$.

The following first to third embodiments are the embodiments of the fluctuation component eliminator 3 included in the information reproducing apparatus S for reproducing the digital information by irradiating the light beam B onto only one track at a time.

As shown in FIG. 2A, the fluctuation component eliminator $3_{-1}$ of the first embodiment is provided with: a shift register 9 serving as an extracting unit and a shift register unit composed of n (n is even-numbered) delay elements $9_{-1}, 9_{-2}, 9_{-3}, \ldots, 9_{-(n-1)}$ and $9_{-n}$ connected in series; an adder 10 serving as an adding unit; a divider 11 serving as a level signal generator 11 and a subtracter 12 serving as an subtraction signal generator.

Next, the operation will be described.

Figure 15:
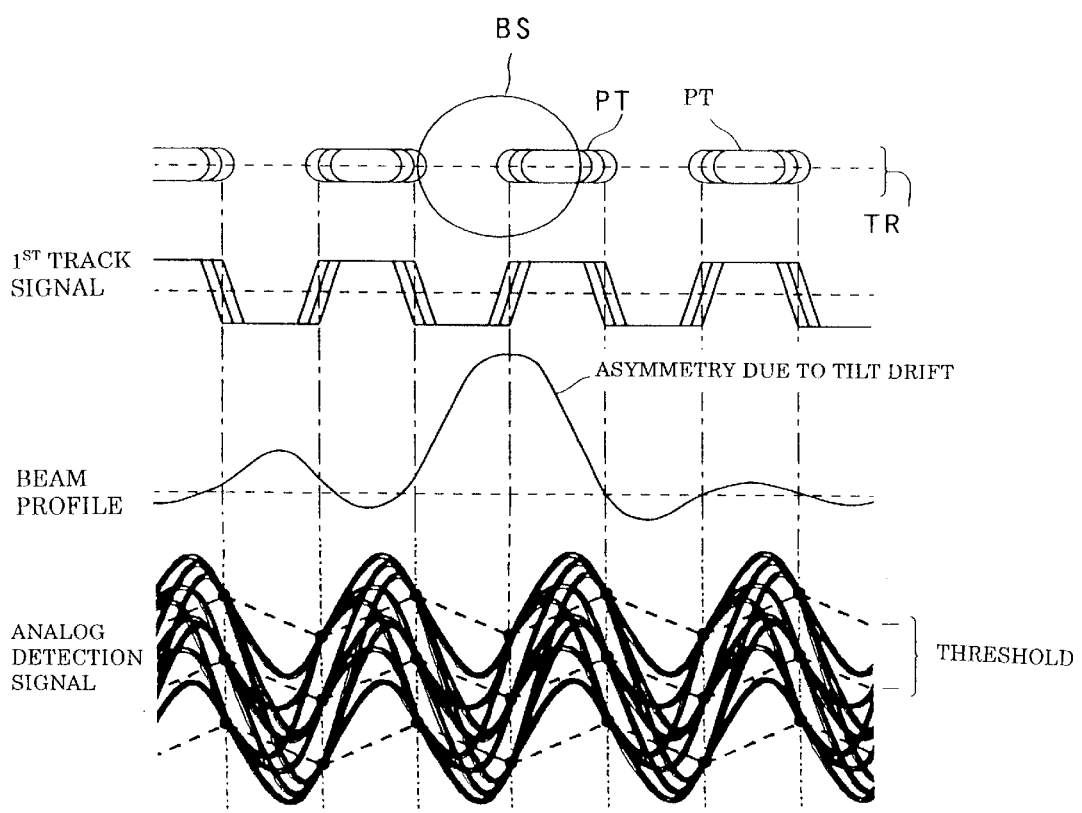
FIG. 15 is a diagram explaining a problem in the conventional process for reproducing digital information by reading one track.

At first, supposing that the delay times of the respective delay elements $9_{-1}, 9_{-2}, 9_{-3}, \ldots, 9_{-(n-1)}$ and $9_{-n}$ included in the shift register 9 are identical to each other, and the delay time is actually defined as T if a cycle of the undulation in the analog detection signal on the bottom stage of FIG. 15 is 2T.

Then, the odd-numbered delay elements $9_{-1}, 9_{-3}, \ldots, 9_{-(n-3)}$ and $9_{-(n-1)}$ among the delay elements $9_{-1}, 9_{-2}, 9_{-3}, \ldots, 9_{-(n-1)}$ and $9_{-n}$ respectively delays the input sample Spp (whose value is expressed as a x(t) (wherein t represent each sampling timing when the input sample Spp is generated in the reproducing head 2) as the occasion demand, hereinbelow) or the respective sample values, which are inputted from the respective delay elements $9_{-2}, 9_{-4}, \ldots, 9_{-(n-2)}$ and $9_{-n}$ at the respective previous stages thereof, by the delay time T and then respectively output the delayed sample values to the delay elements $9_{-2}, 9_{-4}, \ldots, 9_{-(n-2)}$ and $9_{-n}$ at the respective next stages thereof, and also output the delayed sample values to the adder 10 as delayed samples $S_{-1}, S_{-3}, \ldots, S_{-(n-3)}$ and $S_{-(n-1)}$.

On the other hand, even-numbered delay elements $9_{-2}, 9_{-4}, \ldots, 9_{-(n-2)}$ and $9_{-n}$ among the delay elements $9_{-1}, 9_{-2}, 9_{-3}, \ldots, 9_{-(n-1)}$ and $9_{-n}$ respectively delays the respective sample values, which are inputted from the respective delay elements $9_{-1}, 9_{-3}, \ldots, 9_{-(n-1)}$ and $9_{-(n-1)}$ at the respective previous stages thereof, by the delay time T and then respectively output the delayed sample values to the delay elements $9_{-3}, 9_{-5}, \ldots, 9_{-(n-3)}$ and $9_{-(n-1)}$ at the respective next stages thereof, and also invert the signs of the delayed sample values and then output the inverted delayed sample values to the adder 10 as delayed samples $S_{-2}, S_{-4}, \ldots, S_{-(n-2)}$ and $S_{-n}$.

Accordingly, the adder 10 adds all of the respective delayed samples $S_{-1}, S_{-2}, \ldots, S_{-(n-1)}$ and $S_{-n}$, in which their signs are inverted for every other signal, and generates an addition sample c (t), and outputs it to the divider 11.

Then, the divider 11 divides the addition sample c(t) by a numeral "n", which is equal to the number of delay stages of the shift register 9, and generates a division sample Smv, and then outputs it to the subtracter 12. This division sample Smv implies an average value of the levels of the undulations caused by the level fluctuation component included in the original analog detection signal Sap.

So, the subtracter 12 subtracts the division sample Smv from the input sample Spp, and generates the fluctuation eliminated sample Spe after the level fluctuation component is eliminated, and then outputs it to the waveform equalizer 4.

Next, the series of above-mentioned operations in the fluctuation component eliminator 3 will be collectively described below with reference to FIG. 2B.

At first, the whole operation of the shift register 9 and the adder 10 among the above-mentioned respective operations is expressed by a following equation (1).

$$C(t) = \sum_{k=0}^{n-1} (-1)^k x(t - kT) \quad (1)$$

Next, when the operations including that of the subtracter 12 is expressed by using an equation, the fluctuation eliminated sample Spe (hereafter, its value is represented by y(t) as the occasion demand) is represented by a following equation (2).

$$y(t) = x(t) - c(t)/n \quad (2)$$

Now, the series of above-mentioned processes for generating the fluctuation eliminated sample Spe are qualitatively described. As shown in FIG. 2B, this generating process is a process in which a difference d from the sample value in the analog detection signal Sap one sampling timing before is calculated for each sampling timing, and those differences d for the n sampling timings are added together, and then the added result is divided by n, and further the divided result is subtracted from the original input sample Spp. So, this process is equivalent to a process of calculating the average of the fluctuations in the sample value generated for each sampling timing, and then subtracting it from the input sample Spp.

Therefore, the component of the undulation in the analog detection signal Sap caused by the level fluctuation component can be eliminated by the adding process, the averaging process and the subtracting process.

By the way, as for the value of the number n of delay stages in the shift register 9, if the number n is too small, it is impossible to accurately eliminate only the level fluctuation component. On the other hand, if the number n is too large, it takes a long time to generate the fluctuation eliminated sample Spe. Thus, the value of the number n is experimentally determined so as to accurately eliminate only the level fluctuation component and also enable the fast process. Actually, for example, a value of several hundreds is appropriate.

As described above, according to the operation of the fluctuation component eliminator $3_{-1}$ of the first embodiment, when the multi-level-recorded digital information is reproduced, it is reproduced while the level fluctuation component included in the corresponding analog detection signal Sap is extracted and cancelled out to thereby enable the accurate reproduction of the multi-level-recorded digital information.

Also, the multi-level recorded digital information can be optically accurately reproduced even if the tilt drift causes the level fluctuation component to be included in the analog detection signal Sap.

Moreover, an amplitude fluctuation (undulation) of the analog detection signal Sap caused by the mixture of the level fluctuation component into the analog detection signal Sap is averaged and subtracted by using a feed-forward control. Thus, the level fluctuation component can be accurately eliminated to thereby reproduce the digital information.

Furthermore, the number n of delay grades is even-numbered in the shift register 9. Thus, it is possible to protect the drop of a detection accuracy caused by a direct current component generated in the process for averaging the amplitude fluctuations of the analog detection signal Sap.

(II-B) Second Embodiment of Fluctuation Component Eliminator

Figure 3:
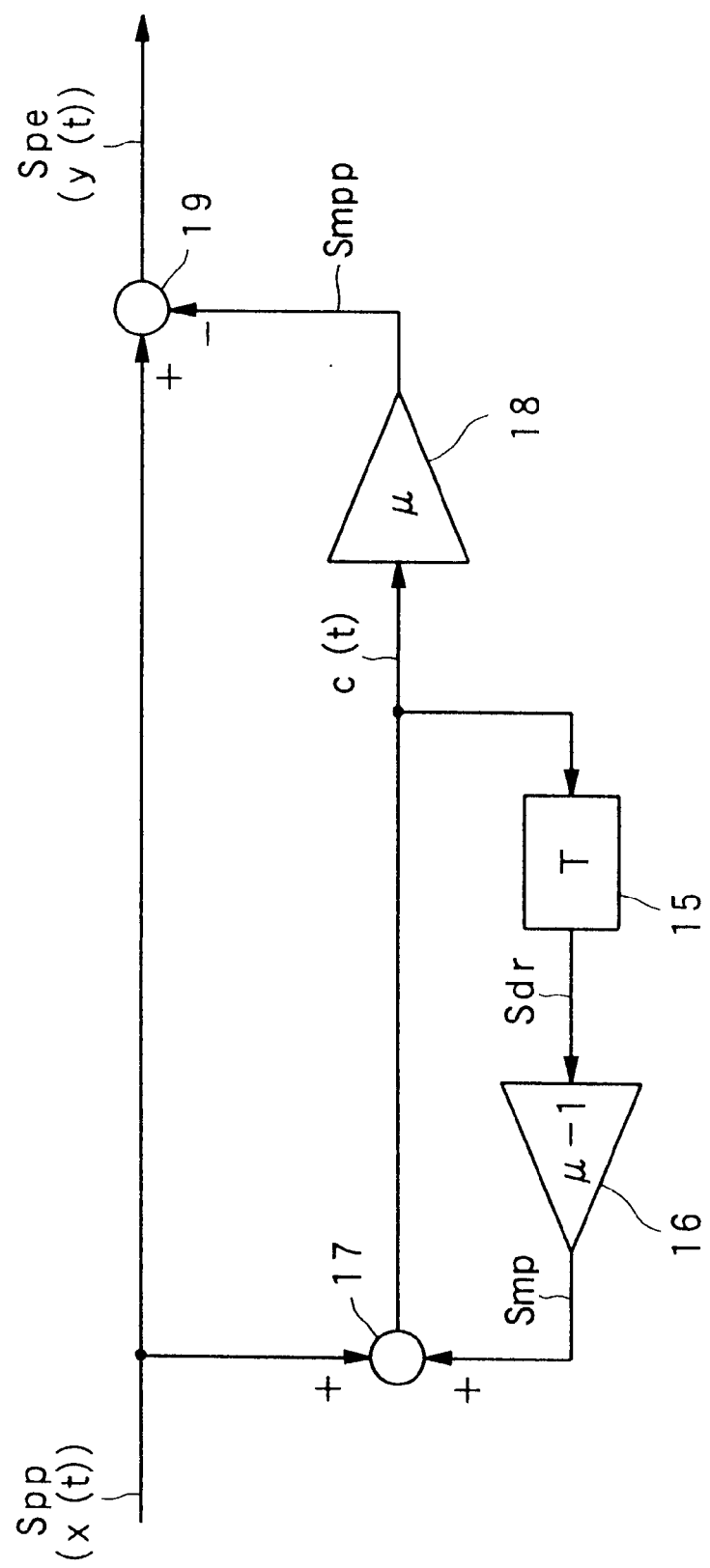
FIG. 3 is a block diagram showing a configuration of a fluctuation component eliminator in the second embodiment.

The second embodiment of the fluctuation component eliminator according to the present invention will be described below with reference to FIG. 3. FIG. 3 is a block diagram showing the detailed configuration of fluctuation component eliminator $3_{-2}$ according to the second embodiment.

In the first embodiment, the average of the differences between the definite (n) sample values in the analog detection signal Sap is used to generate the division signal Smv indicative of the level fluctuation component. However, in the second embodiment, infinite sample values are used to extract the level fluctuation component from the input sample Spp.

As shown in FIG. 3, the fluctuation component eliminator $3_{-2}$ of the second embodiment is provided with a delaying unit 15, a multiplier 16 serving as a second multiplying unit, a multiplier 18 serving as a level signal generator, an adder 17 serving as an adding unit and a subtracter 19 serving as a subtraction signal generator.

Next, the operation is described.

At first, the adder 17 firstly adds the input sample Spp and a multiplied sample Smp that is an output signal from the multiplier 16, and generates an addition sample c(t), and then outputs it to the delaying unit 15 and the multiplier 18.

Next, the delaying unit 15 delays the addition sample c(t) on the basis of the delay time T if the cycle of the undulation in the analog detection signal on the bottom stage of FIG. 15 is 2T, and generates a delayed sample Sdr, and then outputs it to the multiplier 16.

Accordingly, the multiplier 16 multiplies the delayed sample Sdr by a value in which a positive number 1 is subtracted from a constant $\mu$ that is a preset positive number less than 1, and generates a multiplied sample Smp, and then outputs it to the adder 17.

On the other hand, the multiplier 18 multiplies the addition sample c(t) by the constant $\mu$, and generates a multiplied sample Smpp, and then outputs it to the subtracter 19.

Then, the subtracter 19 subtracts the multiplied sample Smpp from the input sample Spp, and generates the fluctuation eliminated sample Spe in which the level fluctuation component is eliminated, and then outputs it to the waveform equalizer 4.

In this configuration, a loop constituted by the delay unit 15, the multiplier 16 and the adder 17 is a so-called circular type adder in which a delay time is T. Accordingly, the addition sample c(t) is generated in accordance with a following equation (3).

$$C(t) = \sum_{k=0}^{\infty} (\mu - 1)^k x(t - kT) \ (0 < \mu < 1) \tag{3}$$

The reason why the delayed sample Sdr is multiplied by the constant "$\mu-1$" is to protect an addition value (i.e., a value of the addition sample c(t)) from being divergent in the circular type adder.

The respective sample values from the infinite past to the current time in the analog detection signal Sap are added by the operation of the circular type adder.

Then, the average component of the undulation in the analog detection signal Sap caused by the level fluctuation component is extracted by multiplying the value of the addition sample c(t) as the addition value by the constant $\mu$. By subtracting this extracted average component from the input sample Spp, the level fluctuation component is eliminated from the input sample Spp.

As for the value of the constant $\mu$ in the respective multipliers 16 and 18, as the value $\mu$ is smaller, the level fluctuation component can be further accurately extracted. However, if the value $\mu$ is too small, it takes a long time to carry out the adding process. Thus, the value $\mu$ is experimentally determined so as to obtain the sufficient accuracy and also enable the fast process.

As described above, according to the operation of the fluctuation component eliminator $3_{-2}$ of the second embodiment, when the multi-level recorded digital information is reproduced, it is reproduced while the level fluctuation component included in the corresponding analog detection signal Sap is extracted and cancelled out to thereby enable the accurate reproduction of the multi-level recorded digital information.

Also, the multi-level recorded digital information can be optically accurately reproduced even if the tilt drift causes the level fluctuation component to be included in the analog detection signal Sap.

Moreover, the amplitude fluctuation (undulation) of the analog detection signal Sap caused by the mixture of the level fluctuation component into the analog detection signal Sap is averaged and subtracted by using the feed-forward control. Thus, the level fluctuation component can be accurately eliminated to thereby reproduce the digital information.

Furthermore, the amplitude fluctuation of the analog detection signal Sap caused by the mixture of the level fluctuation component into the analog detection signal Sap can be averaged and subtracted by using the feed-forward control without using the shift register 9 as described in the first embodiment. Thus, the level fluctuation component can be eliminated easily and accurately to thereby reproduce the digital information.

(II-C) Third Embodiment of Fluctuation Component Eliminator

Figure 4:
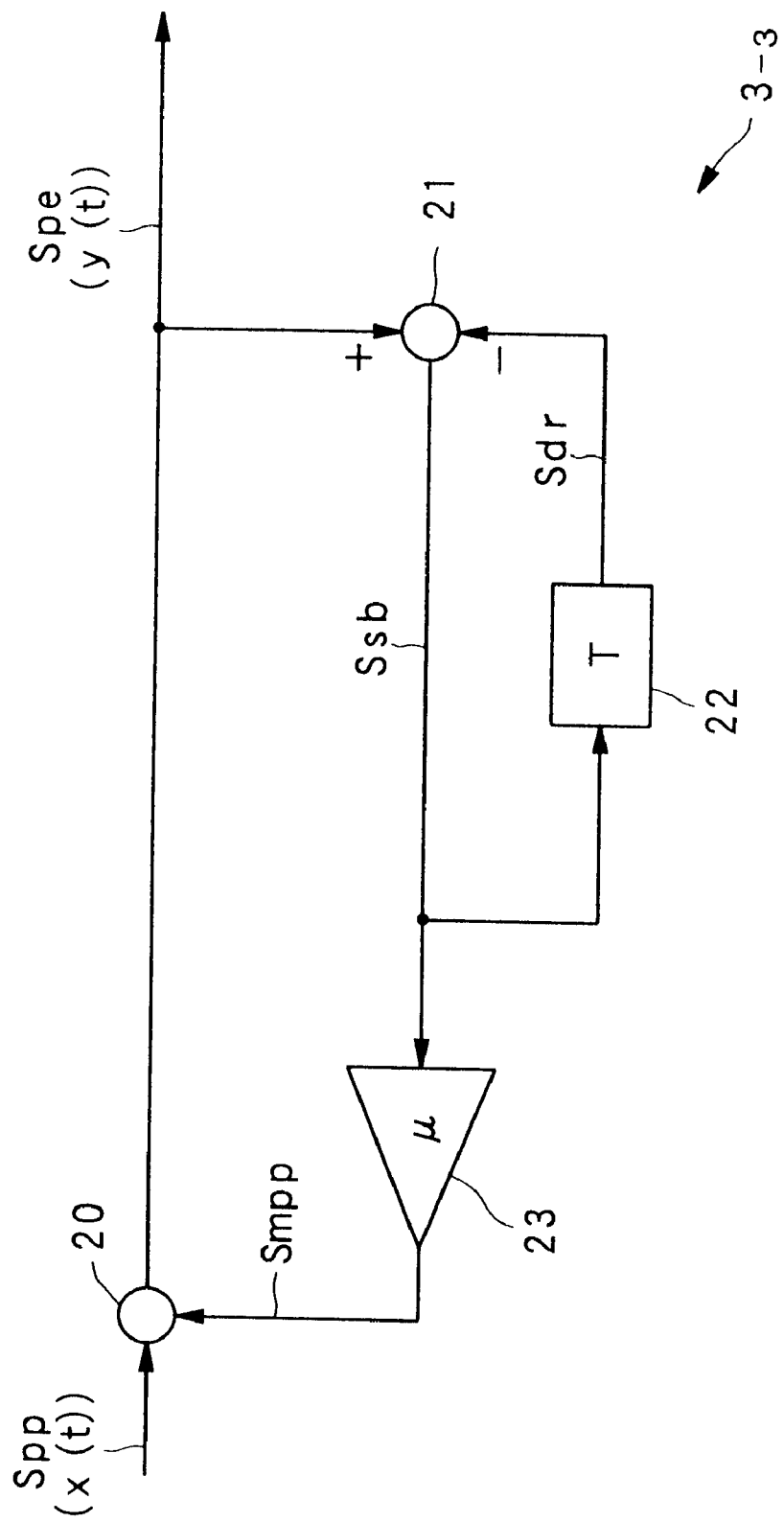
FIG. 4 is a block diagram showing a configuration of a fluctuation component eliminator in the third embodiment.

The third embodiment of the fluctuation component eliminator according to the present invention will be described below with reference to FIG. 4. FIG. 4 is a block diagram showing the detailed configuration of a fluctuation component eliminator $3_{-3}$ according to the third embodiment.

In the first embodiment, the differences between the definite (n) sample values in the analog detection signal Sap is used to generate the division signal Smv indicative of the level fluctuation component. However, in the third embodiment, the feed-back control is used and also the infinite sample values are used similarly to the case of the second embodiment. Accordingly, the level fluctuation component is extracted from the input sample Spp.

As shown in FIG. 4, the fluctuation component eliminator $3_{-3}$ of the third embodiment is provided with a subtracter 20 serving as a subtraction signal generator, a subtracter 21 serving as a second subtracting unit, a delaying unit 22 serving as a delaying device, and a multiplier 23 serving as a level signal generator.

Next, the operation is described.

At first, the subtracter 20 subtracts the multiplied sample Smpp outputted by the multiplier 23 from the input sample Spp, and generates the fluctuation eliminated sample Spe in which the level fluctuation component is eliminated, and then outputs it to the waveform equalizer 4 and the subtracter 21.

Then, the subtracter 21 subtracts the delayed sample Sdr, which is sent from the delaying unit 22, from the fluctuation eliminated sample Spe, and generates a subtracted sample Ssb, and then outputs it to the multiplier 23 and the delaying unit 22.

Accordingly, the delaying unit 22 delays the subtracted sample Ssb by the delay time T if the cycle of the undulation in the analog detection signal on the bottom stage of FIG. 15 is 2T, and then generates the delayed sample Sdr, and further outputs it to the subtracter 21.

On the other hand, the multiplier 23 multiplies the subtracted sample Ssb by the constant $\mu$ similar to that of the second embodiment, and then generates the multiplied sample Smp indicative of the average of the undulations caused by the level fluctuation components, and further outputs it to the subtracter 20.

In this configuration, a loop constituted by the delaying unit 22 and the subtracter 21 constitutes a circular type adder in which a delay time is T. Accordingly, the subtracted sample Ssb is generated as Ssb(t) in accordance with a following equation (4).

$$Ssb(t)=y(t)-Ssb(t\cdot kT) \qquad (4)$$

A negative feedback loop is generated by the operation of this circular type adder so that the undulation caused by the level fluctuation component in the analog detection signal Sap becomes zero.

Then, the average component of the undulation in the analog detection signal Sap caused by the level fluctuation component is extracted by multiplying the value of the subtracted sample Ssb serving as the subtraction value by the constant $\mu$. Then, by subtracting this extracted average component from the input sample Spp, the level fluctuation component is eliminated from the input sample Spp.

As for the value of the constant $\mu$ in the respective multipliers 16 and 18, similarly to the case of the second embodiment, as the value $\mu$ is smaller, the level fluctuation component can be further accurately extracted. However, if the value $\mu$ is too small, it takes a long time to carry out the adding process. Thus, the value $\mu$ is experimentally determined so as to obtain the sufficient accuracy and also enable the fast process.

As described above, according to the operation of the fluctuation component eliminator $3_{-3}$ of the third embodiment, when the multi-level recorded digital information is reproduced, it is reproduced while the level fluctuation component included in the corresponding analog detection signal Sap is extracted and cancelled out to thereby enable the accurate reproduction of the multi-level recorded digital information.

Also, the multi-level recorded digital information can be optically accurately reproduced even if the tilt drift causes the level fluctuation component to be included in the analog detection signal Sap.

Moreover, the amplitude fluctuation of the analog detection signal Sap caused by the mixture of the level fluctuation component into the analog detection signal Sap is averaged and subtracted by using the feedback control without using the shift register 9 as described in the first embodiment. Thus, the level fluctuation component can be eliminated easily and accurately to thereby reproduce the digital information.

(III) Configuration of Information Reproducing Apparatus and Optical Disc According to Fourth and Fifth Embodiments The configurations of an information reproducing apparatus and an optical disc according to fourth and fifth embodiments of a later-described fluctuation component eliminator will be described below with reference to FIG. 5A to FIG. 8.

Figure 5A:
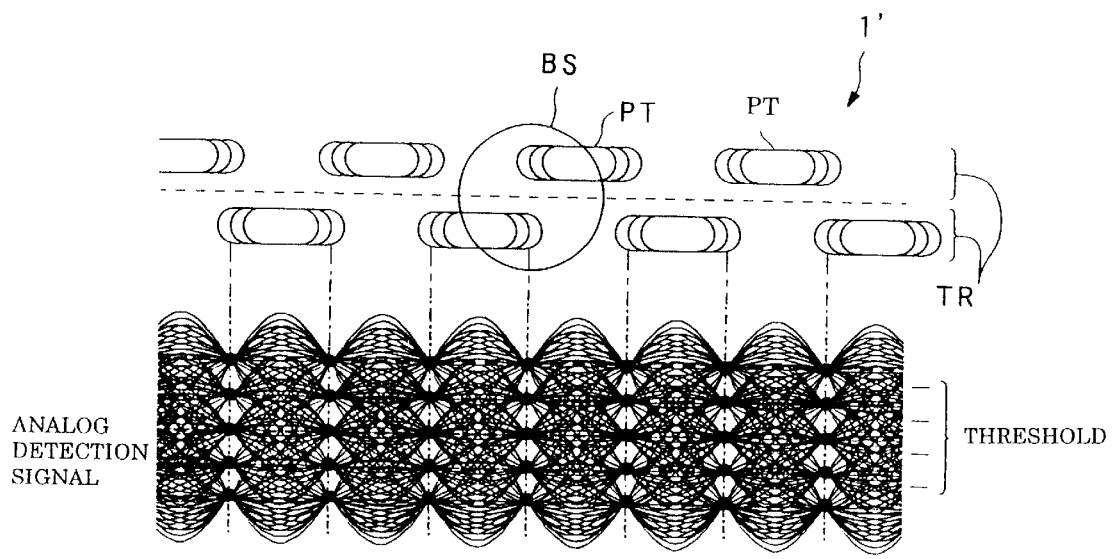
FIG. 5A is a diagram explaining a process for reproducing digital information by reading in two tracks at the same time.
Figure 5B:
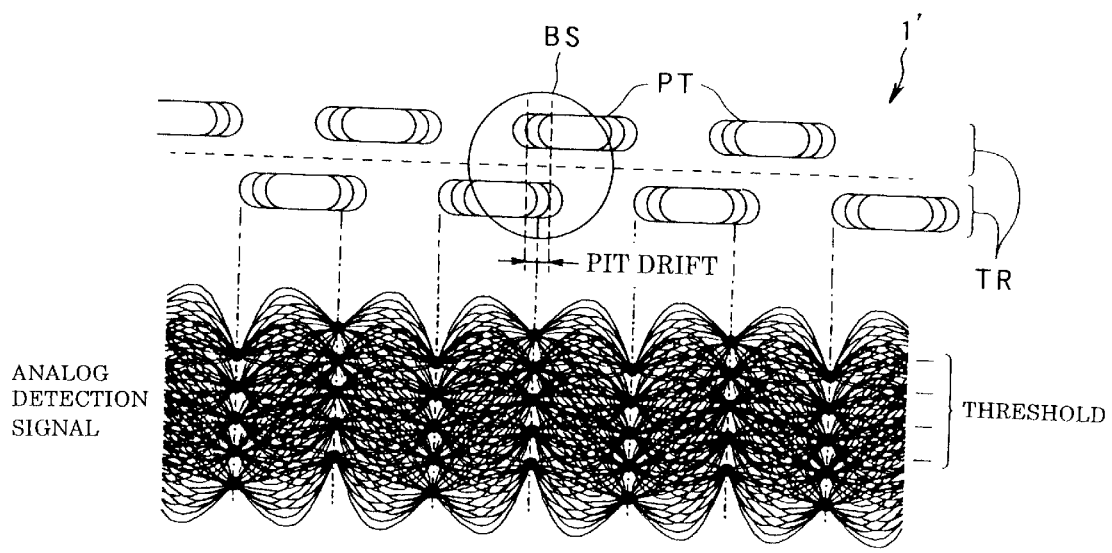
FIG. 5B is a diagram explaining a problem in this process of FIG. 5A.
Figure 7:
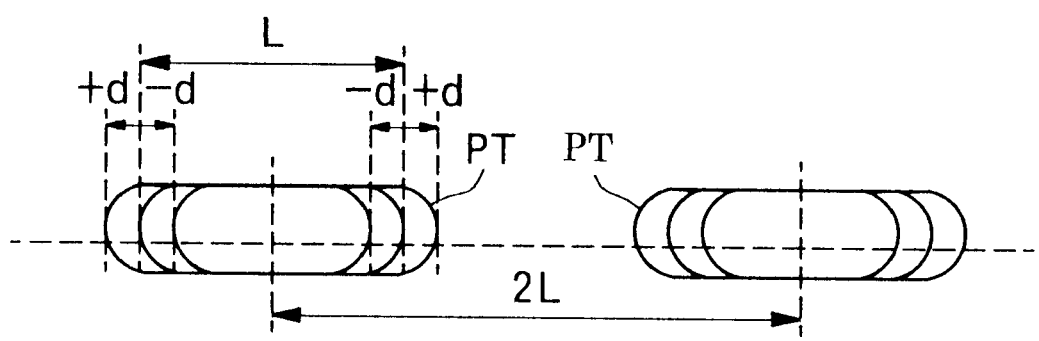
FIG. 7 is an enlarged plan view showing a detailed shape of an information pit.
Figure 8:
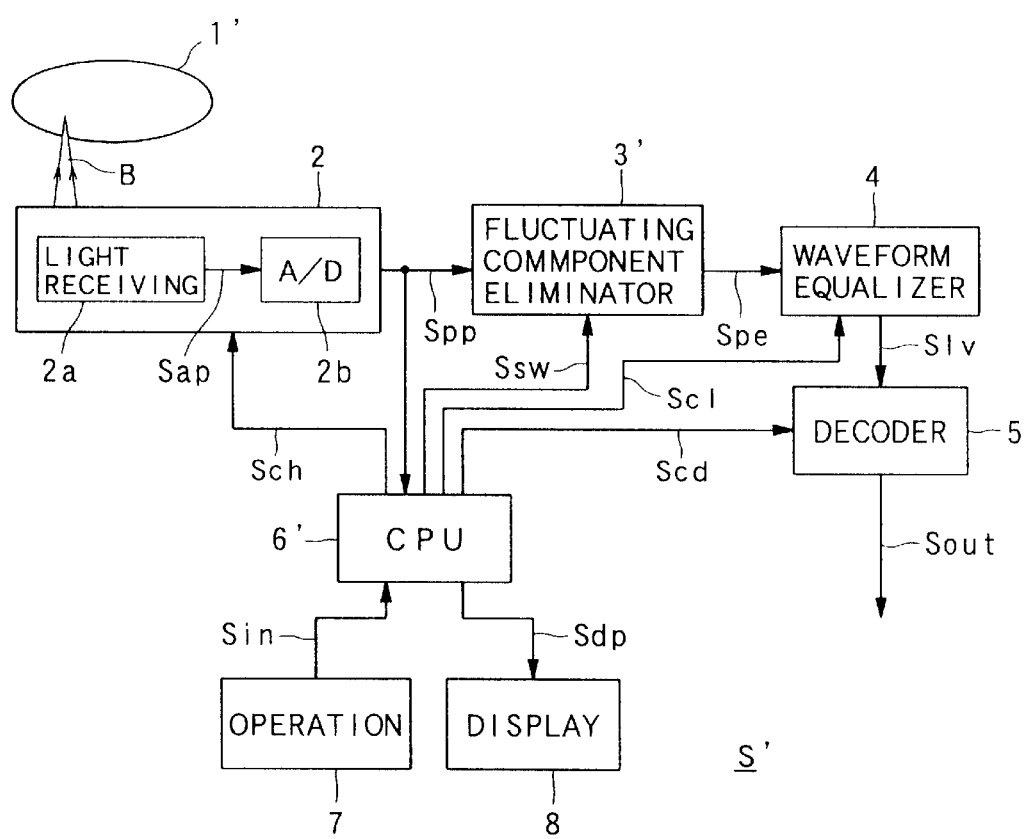
FIG. 8 is a block diagram showing a schematic configuration of an information reproducing apparatus according to the fourth and fifth embodiments.

FIG. 5A and FIG. 5B are diagrams explaining an operation for reproducing digital information, according to the fourth and fifth embodiments. FIG. 6 is an enlarged plan view showing the configuration of the optical disc according to the fourth and fifth embodiments. FIG. 7 is an enlarged plan view, showing the configuration of an information pit. FIG. 8 is a block diagram showing the schematic configuration of the information reproducing apparatus according to the fourth and fifth embodiments.

The case in which the digital information is reproduced by irradiating the light beam B onto only one track at a time is described in the first to third embodiments with regard to the fluctuation component eliminator. In contrast to this, as a method of reproducing the multi-level recorded digital information on the optical disc by using the change of the position of the pit edge, there is also a method of reproducing the digital information by irradiating the reproduction light beam B onto two parallel tracks at a time.

The fourth and fifth embodiments with regard to the fluctuation component eliminator as described below are intended to explain the fluctuation component eliminator in the information reproducing apparatus for irradiating a reproducing light beam B onto an optical disc, in which the phases of the information pits for multi-level recording are opposite to each other between two parallel tracks TR adjacent to each other, in such a way that pit edges located on the two tracks TR are included within one beam spot BS at a time, in order to always make a central level substantially constant in the analog detection signal detected by simultaneously irradiating the light beam onto the two tracks at a time, as shown in FIG. 5A while the multi-level digital information recorded in each pit edge is reproduced. In addition, the above-mentioned technique in which the information pits PT for the multi-level recording operation are formed such that they are opposite to each other between the two tracks TR adjacent to each other is included in the content applied by the inventor. However, this is not a known technique.

Now, a pit edge multi-level recording and reproducing method of simultaneously reading the pit edges on the two tracks TR in the fourth and fifth embodiments is schematically described.

Figure 14:
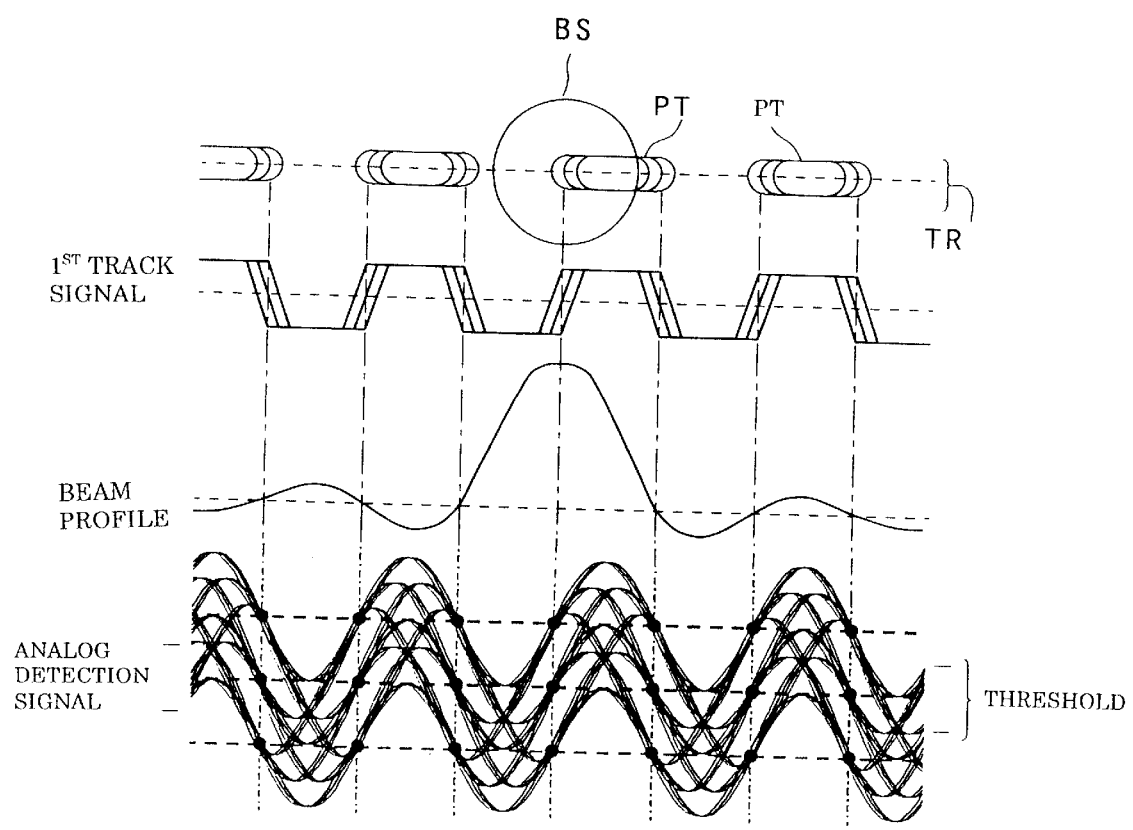
FIG. 14 is a diagram explaining a conventional process for reproducing digital information by reading one track.

As shown on a top stage of FIG. 5A, in the pit edge multi-level recording method, an information pit row composed of information pits PT having a constant cycle is formed on the track TR. Also, a position of a pit edge in each information pit PT is changed by multiple steps (for example, the three steps as shown in FIG. 14 or FIG. 15) in a rotation direction of the optical disc based on a value of the above-mentioned digital information. On the top stage of FIG. 5A, the positions that can be considered as the position of the pit edge in each information pit PT are all shown by using solid lines. However, a pit edge is actually formed at any one position among three pit edge positions (similarly in FIG. 5B, FIG. 6 and FIG. 7 described later).

Further, in the optical disc on which the digital information is recorded by using the pit edge multi-level recording and reproducing method, the phases of the respective information pits PT are opposite to each other between the tracks TR adjacent to each other (in other words, the land area on one track TR is adjacent to an information pit PT on another track TR adjacent to the one track, while an information pit PT on one track TR is adjacent to the land area on another track TR adjacent to the one track).

On the other hand, the reproduction light beam irradiated onto the optical disc in the pit edge multi-level recording and reproducing method generates a beam spot BS having an irradiation range indicated by a circle on the top stage of FIG. 5A. Two pit edges adjacent to each other are included in this beam spot BS. Since this beam spot BS is moved on a middle line between the two tracks TR as indicated by a dotted line, it is possible to simultaneously read the multi-level recorded digital information that is recorded in the two pit edges.

When the light beam B is irradiated in a manner as shown on the top stage of FIG. 5A, an analog detection signal detected on the basis of the reflection light has a waveform as shown on the bottom stage of FIG. 5A.

The bottom stage of FIG. 5A shows a plurality of kinds of waveforms having the possibility that they may be detected as the analog detection signal in such; a way that all of them overlap with each other. However, the actual analog detection signal has any one waveform among many waveforms shown on the bottom stage of FIG. 5A. Moreover, the bottom stage of FIG. 5A shows the case that a level of the analog detection signal is made higher when the information pit PT is read (similarly in FIG. 5B as described later).

At this time, as shown on the bottom stage of FIG. 5A, the output analog detection signal is separated into multiple levels corresponding to five values in which the multiple levels corresponding to positions of the two pit edges are added together, at a timing corresponding to the average change point from the information pit to the land area or from the land area to the information pit. Then, the analog detection signal is sampled at the timing corresponding to this average change point. Moreover, the sampled value is threshold-judged on the basis of four thresholds (i.e., the thresholds having values corresponding to respective middle values between the five values) shown on the bottom stage of FIG. 5A. Accordingly, the value of the digital information recorded in each pit edge is recovered/reproduced.

Here, in the pit edge multi-level recording and reproducing method shown in FIG. 5A, because of the rotational irregularity of the optical disc when the digital information is recorded onto the optical disc, there may be a case that the drift (a so-called "pit drift") of the rotation direction of the optical disc is induced in the formation position of the information pit PT between the tracks adjacent to each other, as shown on the top stage of FIG. 5B. Then, if the digital information is reproduced from the optical disc in such a state by using the method shown in FIG. 5A, the pit drift causes the level fluctuation component to be mixed into the analog detection signal at the time of the reproduction, as shown on the bottom stage of FIG. 5B. Accordingly, if the analog detection signal is threshold-judged as shown in FIG. 5A in this condition that the level fluctuation component is mixed, this leads to a problem that an error is induced in the judged result.

That is, as shown in FIG. 5B, if the pit drift is induced in the formation position of the information pit PT, the pit and land repetition component in the analog detection signal to be originally cancelled out is not actually cancelled out because of the fact that the phase of the information pits PT are opposite to each other between the two tracks TR adjacent to each other. Thus, even if the above-mentioned phase fluctuation component is not included in the reproducing system, the pit and land repetition component remaining therein without the cancel appears as the level fluctuation component at each sampling timing of the analog detection signal. The change of the value, when the analog detection signal in this state is sampled at the sampling timing equal to the case shown in FIG. 5A, includes the upright and downward undulation similar to that of the case of FIG. 15, as shown on the bottom stage of FIG. 5B.

Thus, if the sample values containing those undulations are threshold-judged in accordance with the threshold similar to the case of FIG. 5A, a judgment value is outputted which is different from a value of the digital information actually recorded in a corresponding pit edge. Accordingly, this results in the occurrence of the decode error similar to the case shown in FIG. 15.

So, the optical disc according to the fourth and fifth embodiments is designed as follows. That is, a standard pit, which is a pit having an edge at a standard position that does not carry the multiple level digital information, differently from the information pit PT, is formed on the track TR.

Then, the level fluctuation component is extracted in accordance with an analog detection signal obtained from the reflection light of the light beam B from the standard edge, and it is cancelled out.

Next, the pit shape and the array (record format) in the optical disc according to the fourth and fifth embodiments will be described below with reference to FIG. 6. FIG. 6 is an enlarged plan view showing the pit shape and the array in a part of the optical disc according to the fourth and fifth embodiments.

In the optical disc according to the fourth and fifth embodiments, pits such as the information pits and the like, are arranged in accordance with a so-called sample servo format.

That is, as shown on a top stage of FIG. 6, the optical disc 1' is provided with: a servo area SA containing (i) a synchronization pit PS used for a synchronization control in a rotation control of a spindle motor for rotating the optical disc 1' at the time of the reproduction, a generation of a reproduction clock in the information reproducing apparatus and the like and (ii) a tracking pit PR used for the control in which the light spot in the light beam for the information reproduction follows on the track TR formed on the optical disc 1'; and a data area DA in which digital information to be actually reproduced is multi-level-recorded in the information pit PT. Here, a plurality of servo areas SA are formed for each preset constant interval in the rotation direction of the optical disc 1'.

At this time, in the servo area SA, the synchronization pits PS having a preset constant pit length are formed, one by one, for each track TR on the same radius on each track TR. Also, the tracking pits PR are formed at a constant interval in the rotation direction of the optical disc 1', one by one, for one track TR within one servo area SA.

On the other hand, each information pit PT in the data area DA is changed in the three steps, with regard to the value of the digital information to be carried at the position of each pit edge, similarly to the case of the first to third embodiments. The phase of the formation positions of the respective information pits PT are opposite to each other between the tracks TR adjacent to each other. Here, actually as for the shape of the information pit PT, as shown in FIG. 7, a standard pit length is set to, for example, "L". Moreover, the interval between the information pits PT is set to "2L", and positions of the respective pit edges are set to the positions respectively separated by distances corresponding to "+d", "0" and "−d" from the standard position corresponding to the central value of the three-value digital information.

When the multi-level digital information which is recorded in the data area DA is reproduced, the digital information are simultaneously read which are carried by the information pits PT that are located on the substantially same radius of the optical disc 1' and are also located on the two tracks TR adjacent to each other in the radius direction. At this time, the beam spot BS of the light beam B is moved on the middle line between the two tracks TR.

In addition to this, the optical disc 1' according to the fourth and fifth embodiments has a standard edge area REA having the standard pit RP, which does not carry the digital information, at a predetermined position, which is set in advance, in the data area DA.

Then, as shown on the top stage of FIG. 6, for example, if a three-value digital information is carried by the optical disc 1', the pit edge within the standard edge area REA in the standard pit PT is defined as the standard edge RE formed at a standard position corresponding to the central value of the three values.

At this time, the standard edge area REA is formed at a position corresponding to at least one timing preset in one servo cycle implying a cycle in which the servo area SA is formed, as shown on the bottom stage of FIG. 6. In addition, two or more standard edge areas REA may be formed in the one servo cycle.

The whole configuration and operation of the information reproducing apparatus including the fluctuation component eliminator in the fourth and fifth embodiments will be described below with reference to FIG. 8. Here, FIG. 8 is a block diagram showing the schematic configuration of the information reproducing apparatus including the fluctuation component eliminator according to the fourth and fifth embodiments.

In FIG. 8, the same constitutional elements as those in the information reproducing apparatus S shown in FIG. 1 carry the same reference numerals, and the detailed explanations thereof are omitted.

As shown in FIG. 8, an information reproducing apparatus S' having the fluctuation component eliminator in the fourth and fifth embodiments is provided with a reproducing head 2, a waveform equalizer 4, a decoder 5, an operation unit 7 and a display unit 8 which are similar to those shown in FIG. 8, and a fluctuation component eliminator 3' and a CPU 6' according to the present invention.

The whole operation will be described below.

Since the respective operations of the reproducing head 2, the waveform equalizer 4, the decoder 5, the operation unit 7 and the display unit 8 are equal to those of the case shown in FIG. 1, the detailed explanations are omitted.

In addition, the fluctuation component eliminator 3', in accordance with a switch signal Ssw from the CPU 6', eliminates the level fluctuation component (i..t, the undulation of each sample value in the input sample Spp) included in the input sample Spp by using later-described respective operations, and generates the fluctuation eliminated sample Spe, and then outputs it to the waveform equalizer 4.

Moreover, the CPU 6' detects a timing when the standard edge RE within the standard edge area REA is reproduced, in accordance with the input sample Spp outputted by the reproducing head 2, in addition to the operation for generating the respective control signals Sch, Scl and Scd in the case of the information reproducing apparatus S, and then generates the switch signal Ssw on the basis of this detected timing, and further outputs it to the fluctuation component eliminator 3'.

Accordingly, the CPU 6' has a synchronization pit detector and a counter which are not shown. In accordance with the value of the input sample Spp, the synchronization pit detector in the CPU 6' detects a lead timing of the servo area SA. Moreover, the counter in the CPU 6' starts a counting operation from this detected lead timing. Then, the switch signal Ssw is generated by the CPU 6' when this counted value becomes equal to a count value preset as a reproduction timing of each standard edge RE.

(III-A) Fourth Embodiment of Fluctuation Component Eliminator

Figure 9:
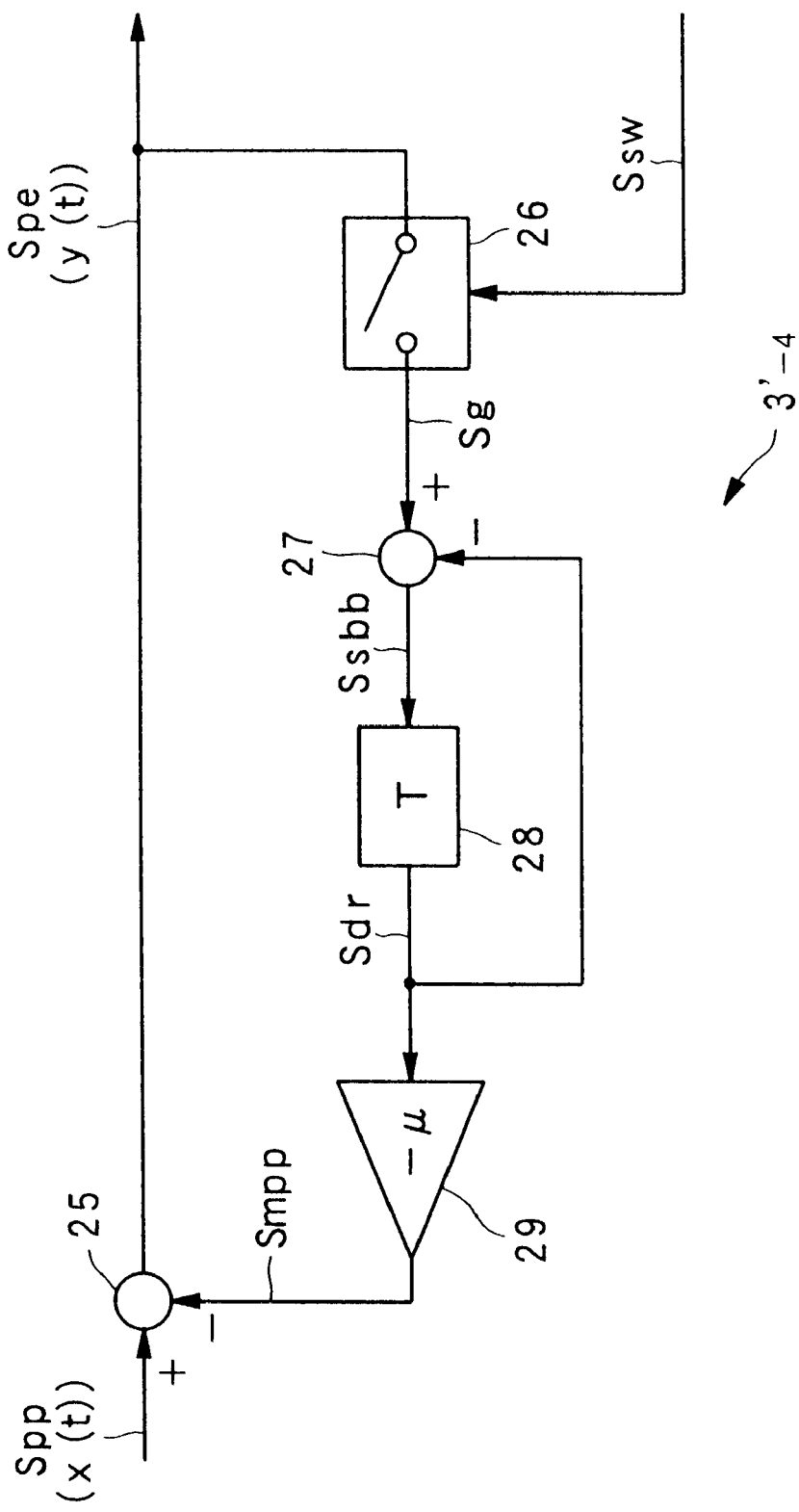
FIG. 9 is a block diagram showing a configuration of a fluctuation component eliminator in the fourth embodiment.
Figure 10:
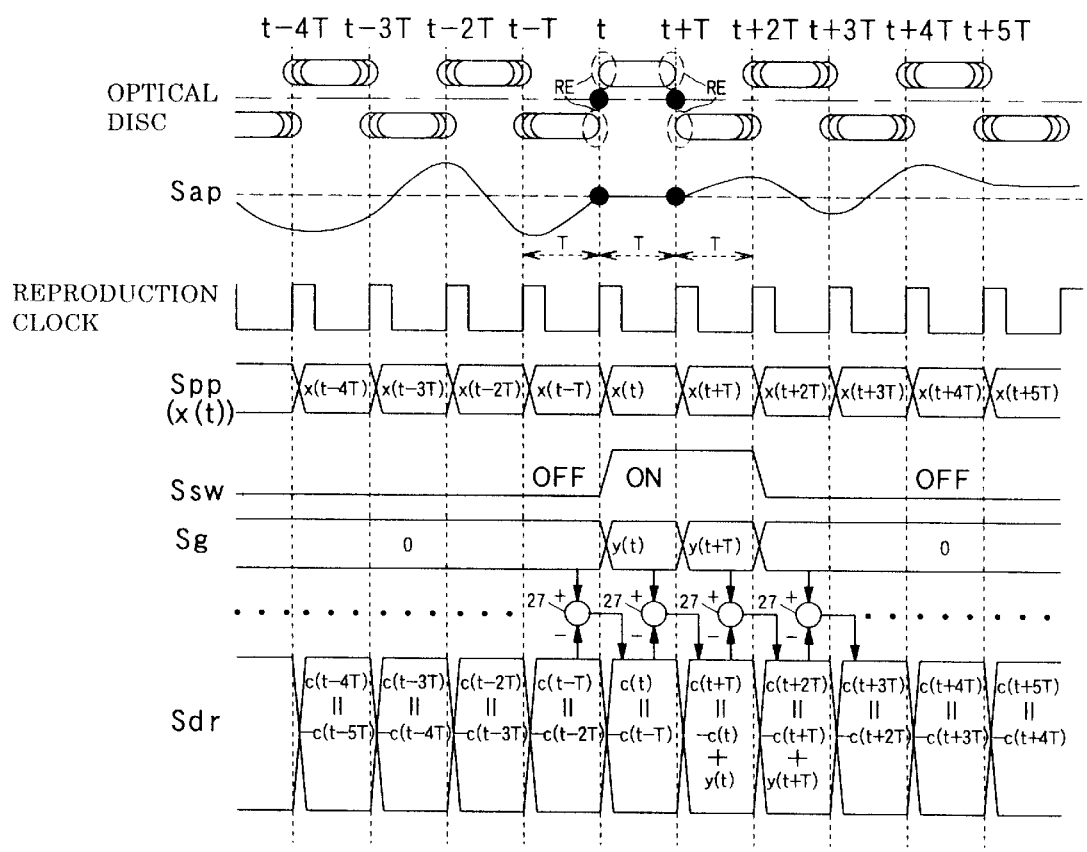
FIG. 10 is a timing chart showing an operation of the fluctuation component eliminator in the fourth embodiment.

The fourth embodiment of a fluctuation component eliminator according to the present invention will be described below with reference to FIG. 9 and FIG. 10. FIG. 9 is a block diagram showing the detailed configuration of a fluctuation component eliminator $3'_{-4}$ according to the fourth embodiment, and FIG. 10 is a timing chart showing that operation.

As mentioned above, the fluctuation component eliminator $3'_{-4}$ of the fourth embodiment uses the input sample Spp generated at a timing when the standard pit RE is reproduced to thereby eliminate the level fluctuation component.

That is, as shown in FIG. 9, the fluctuation component eliminator $3'_{-4}$ of the fourth embodiment is provided with a subtracter 25 serving as a subtraction signal generator, a subtracter 27 serving as a second subtracting unit, a gate switch 26, a delaying unit 28 serving as a delaying device, and a multiplier 29 serving as a level signal generator.

Next, the operation will be described below.

At first, the subtracter 25 subtracts a multiplied sample Smpp outputted by the multiplier 29 from the input sample Spp, and generates the fluctuation eliminated sample Spe in which the level fluctuation component is eliminated, and outputs it to the waveform equalizer 4 and the gate switch 26.

At this time, a switch signal Ssw to turn on the gate switch 26 only for a time period while the input sample Spp obtained by the reproduction of the standard edge RE is inputted to the fluctuation component eliminator $3'_{-4}$ is inputted from the CPU 6' to the gate switch 26.

Accordingly, the gate switch 26 passes only the fluctuation eliminated sample Spe generated from the input sample Spp obtained by the reproduction of the standard edge RE, and outputs it to the subtracter 27 as a gate sample Sg.

Then, the subtracter 27 subtracts a delayed sample Sdr, which is outputted by the delaying unit 28, from the gate sample Sg, and generates a subtracted sample Ssbb, and then outputs it to the delaying unit 28.

Accordingly, the delaying unit 28 delays the subtracted sample Ssbb by the delay time T if the cycle of the undulation shown on the bottom stage of FIG. 15 in the analog detection signal Sap is 2T, and then generates the delayed sample Sdr, and further outputs it to the subtracter 27 and the multiplier 29.

Then, the multiplier 29 multiplies the delayed sample Sdr by a value, which is obtained by inverting the sign of the constant $\mu$ similar to that of the second or third embodiment, and then generates the multiplied sample Smpp indicative of the average of the undulations caused by the level fluctuation components, and further outputs it to the subtracter 25.

Next, the operations of the above-mentioned respective constitutional elements will be described below with reference to a timing chart shown in FIG. 10.

At first, on a top stage of FIG. 10, four standard edges RE are formed at positions (shown by black circles in FIG. 10) corresponding to two sampling timings, on the optical disc 1'.

Then, a level of the analog detection signal Sap corresponding to the standard edge RE is substantially at a zero level. This fourth embodiment uses an input sample Spp corresponding to the analog detection signal Sap that is substantially at the zero level to thereby eliminate the level fluctuation component.

That is, the input sample Spp changes at each timing when a reproduction clock (period T) used as the standard of the reproducing operation in the information reproducing apparatus S' becomes at a "HIGH" level. At this time, the gate switch 26 is turned on only in the time period 2T corresponding to the standard edge RE, and passes the level fluctuation samples y(t) and y(t+T), which are respectively generated by input samples x(t) and x(t+T) inputted in this time period, as the gate sample Sg. Thus, a sample value "0" is continuously outputted as the gate sample Sg in time period other than the time period while the gate switch 26 is turned on.

A delayed sample Sdr having a value shown on a bottom stage of FIG. 10 is generated by the operations of the delaying unit 28 and the subtracter 27 by using this gate sample Sg. At this time, delayed samples Sdr corresponding to times "t" and "t+2T" are obtained by subtracting delayed sample Sdr corresponding to one sampling timing before from the level fluctuation samples y(t) and y(t+T) respectively generated at the times "t" and "t+T" respectively. Accordingly, a delayed sample Sdr (namely, a multiplied sample Smpp) to eliminate the level fluctuation component is newly generated.

Then, the average component of the undulations in the analog detection signal Sap caused by the level fluctuation component is extracted by multiplying the value of that delayed sample Sdr by the value, which is obtained by inverting the sign of the constant $\mu$. This extracted value is subtracted from the input sample Spp. Thus, the level fluctuation component is eliminated from the input sample Spp.

By the way, at a timing other than the timings (i.e., the time t and the time (t+T)) when the standard edge RE is detected, the value of the gate sample Sg is zero as shown in FIG. 10. Thus, as values of the delayed samples Sdr in the other timings, a delayed sample Sdr is generated which has the same absolute value and whose sign is inverted at each sampling timing. In accordance with this delayed sample Sdr, a multiplied sample Smpp is generated, which has the same value and whose sign is inverted at each sampling timing, and is subtracted from the input sample Spp. Hence, the fluctuation eliminated sample Spe is generated by the repetition of the above-mentioned operations.

As for the value of the constant $\mu$ in the multiplier 29, similarly to the case of the second or third embodiment, as the value $\mu$ is smaller, the level fluctuation component can be further accurately extracted. On the other hand, if the value $\mu$ is too small, it causes the tracking speed of the fluctuation component eliminator $3'_{-4}$ to be made slower. Thus, the value $\mu$ is experimentally determined so as to obtain the sufficient accuracy and also enable the fast process.

As described above, according to the operation of the fluctuation component eliminator $3'_{-4}$ of the fourth embodiment, when the multi-level recorded digital information is reproduced, it is reproduced while the level fluctuation component included in the corresponding analog detection signal Sap is extracted and cancelled out to thereby enable the accurate reproduction of the multi-level recorded digital information.

The multi-level-recorded digital information can be optically accurately reproduced even if the positional drift of the information pit PT causes the level fluctuation component to be included in the analog detection signal Sap.

Moreover, the amplitude fluctuation of the analog detection signal Sap caused by the mixture of the level fluctuation component into the analog detection signal Sap is averaged and subtracted by using the feedback control, in accordance with the subtraction signal Ssbb corresponding to the standard pit PT. Thus, even if the digital information recorded in a plurality of pit edges striding over a plurality of tracks are reproduced at the same time, the level fluctuation components can be accurately eliminated to thereby reproduce the digital information.

(III-B) Fifth Embodiment of Fluctuation Component Eliminator

Figure 11:
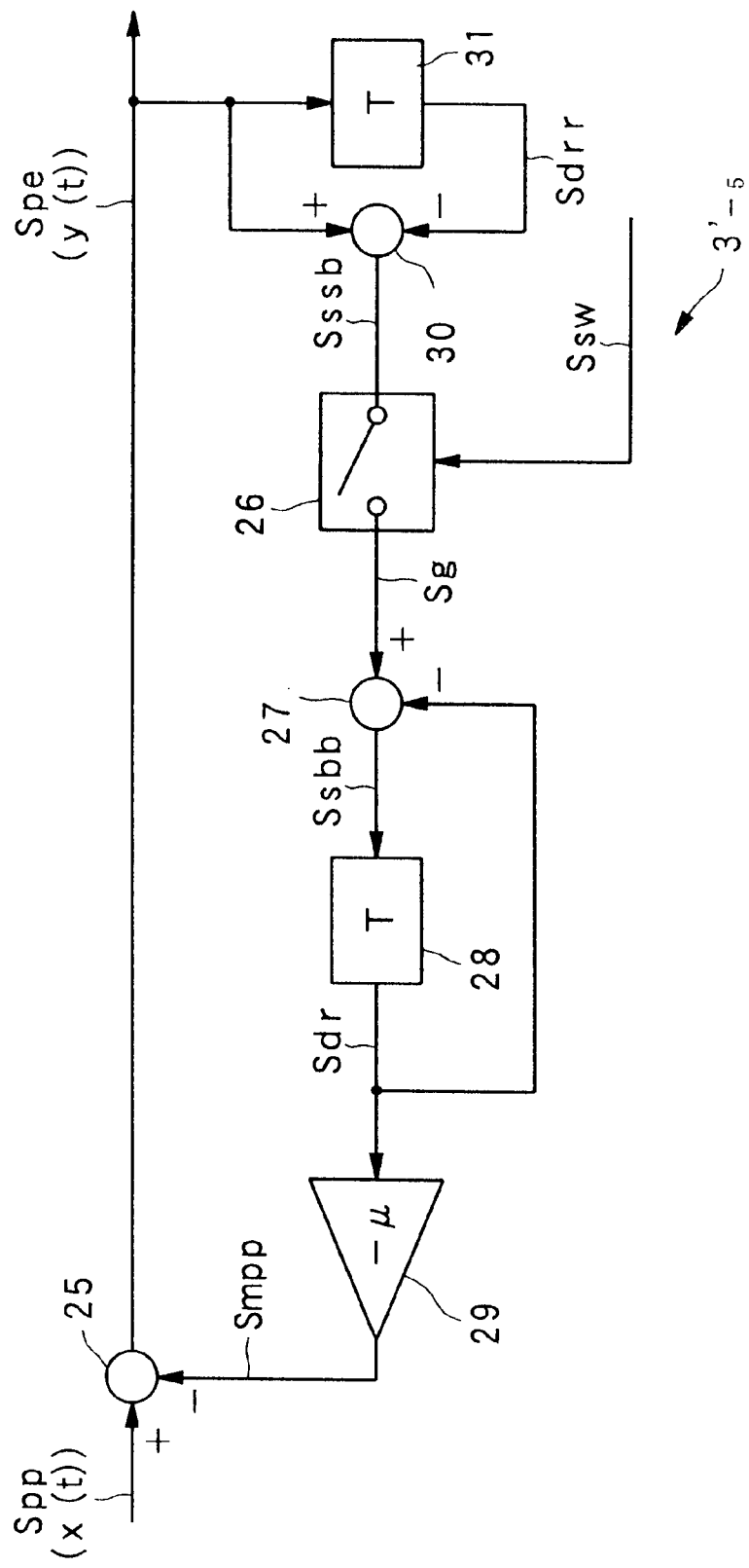
FIG. 11 is a block diagram showing a configuration of a fluctuation component eliminator in the fifth embodiment.
Figure 12:
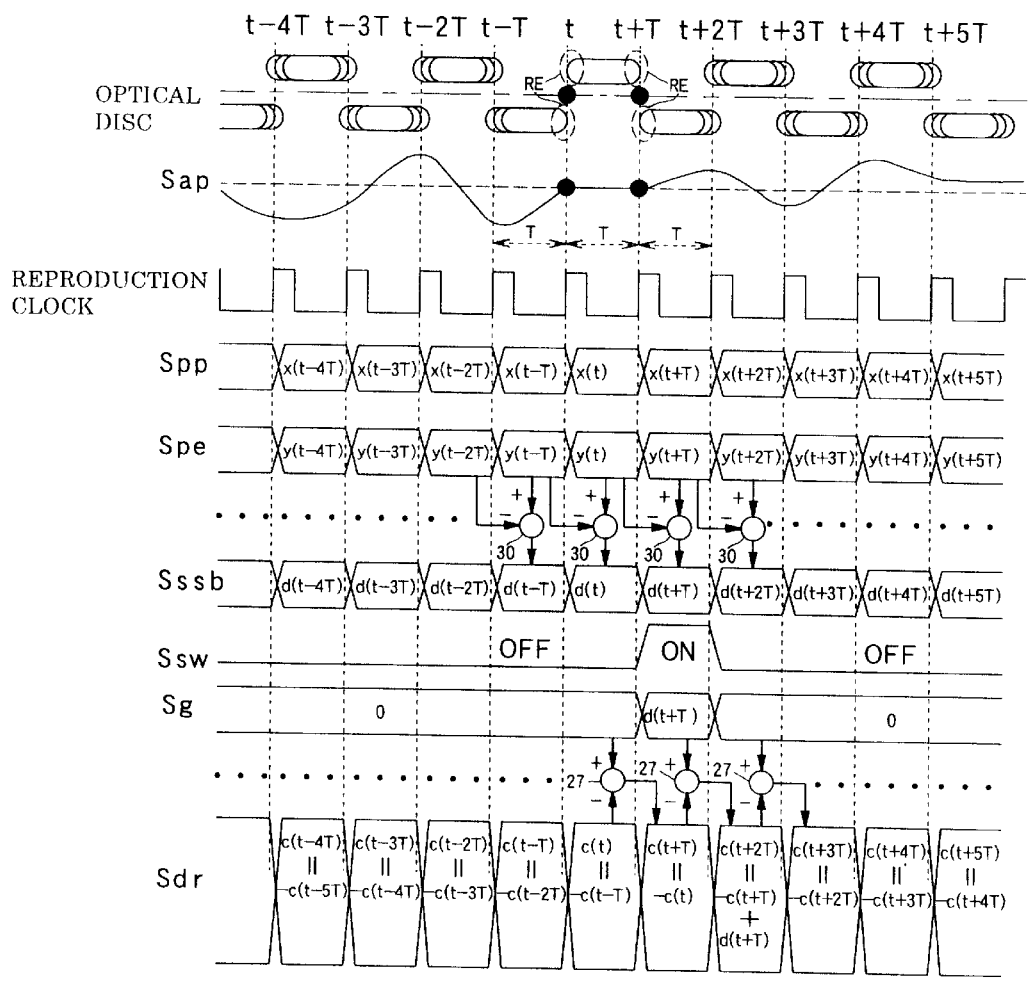
FIG. 12 is a timing chart showing an operation of the fluctuation component eliminator in the fifth embodiment.

The fifth embodiment of the fluctuation component eliminator according to the present invention will be described below with reference to FIG. 11 and FIG. 12. FIG. 11 is a block diagram showing the detailed configuration of a fluctuation component eliminator $3'_{-5}$ according to the fifth embodiment, and FIG. 12 is a timing chart showing that operation. In FIG. 11, the same constitutional elements as those in FIG. 9 carry the same reference numerals and the detailed explanations thereof are omitted.

The fluctuation component eliminator $3'_{-5}$ of the fifth embodiment eliminates the level fluctuation component by using the input sample Spp generated at the timing when the standard pit RE is reproduced, similarly to the case of the fourth embodiment. However, in the fifth embodiment as shown in FIG. 12, the fluctuation eliminated sample Spe is taken in at a latter timing of two timings corresponding to the standard edge RE, to thereby extract the level fluctuation component.

That is, as shown in FIG. 11, the fluctuation component eliminator $3'_{-5}$ of the fifth embodiment is provided with a subtracter 30 serving as a subtracting unit and a delaying unit 31 serving as a first delaying unit, in addition to the subtracter 25 serving as the subtraction signal generator, the subtracter 27 serving as the second subtracting unit, the gate switch 26, the delaying unit 28 serving as a second delaying unit, and the multiplier 29 serving as the level signal generator in the fluctuation component eliminator $3'_{-4}$ of the fourth embodiment.

Next, the operation will be described below.

At first, the delaying unit 31 delays the fluctuation eliminated sample Spe generated by the subtracter 25 by one sampling timing period (T), and generates a delayed sample Sdrr, and then outputs it to the subtracter 30.

Then, the subtracter 30 subtracts the delayed sample Sdrr from the fluctuation eliminated sample Spe, and generates the subtracted sample Sssb, and then outputs it to the gate switch 26.

After that, the gate switch 26, the subtracter 27, the delaying unit 28 and the multiplier 29 carry out the operations similar to those of the fluctuation component eliminator $3'_{-4}$, and generate the multiplied sample Smpp, and then outputs it to the subtracter 25.

Then, the subtracter 25 subtracts the generated multiplied sample Smpp from the input sample Spp, and generates the fluctuation eliminated sample Spe, and then outputs it to the delaying unit 31, the subtracter 30 and the waveform equalizer 4.

At this time, a switch signal Ssw to turn on the gate switch 26 only for a time period while the input sample Spp obtained at the latter sampling timing of the two sampling timings corresponding to the standard edge RE is inputted to the fluctuation component eliminator $3'_{-5}$ is inputted from the CPU 6' to the gate switch 26.

Next, the operations of the respective constitutional elements will be described below with reference to a timing chart shown in FIG. 12.

At first, on a top stage of FIG. 12, the four standard edges RE are formed at the positions corresponding to the two sampling timings, on the optical disc 1', similarly to the case of the fourth embodiment.

Then, the level of the analog detection signal Sap corresponding to the standard edge RE is substantially at a zero level. This fifth embodiment uses two input samples Spp corresponding to the analog detection signal Sap that is substantially at the zero level to thereby eliminate the level fluctuation component.

That is, the input sample Spp changes at each timing when the reproduction clock (whose cycle is T) used as the standard for the reproducing operation in the information reproducing apparatus S' becomes at a "HIGH" level. At this time, as the subtracted sample Sssb, a sample in which a fluctuation eliminated sample Spe one sampling timing before is subtracted from a fluctuation eliminated sample Spe at the current sampling timing is generated as a subtracted sample Sssb at the current sampling timing.

Then, the gate switch 26 is turned on only in the period T corresponding to the latter sampling timing (i.e., the sampling timing corresponding to the time "t+T") among the sampling timings of the standard edge RE, and passes the subtracted sample Sssb inputted in that period as the gate sample Sg. Thus, the sample value "0" is continuously outputted as the gate sample Sg in the period other than the period while the gate switch 26 is turned on, similarly to the case of FIG. 10.

A delayed sample Sdr having a value shown on a bottom stage of FIG. 12 is generated by the operations of the delaying unit 28 and the subtracter 27 by using this gate sample Sg. At this time, a delayed sample Sdr generated one sampling timing before (i.e., at the sampling timing corresponding to the time "t") is subtracted from the gate sample Sg (i.e., the subtracted sample Sssb) generated at the time "t+T". Thus, a delayed sample Sdr (namely, a multiplied sample Smpp) corresponding to the time "t+2T" is newly generated to eliminate the level fluctuation component.

Then, the average component of the undulations in the analog detection signal Sap caused by the level fluctuation component is extracted by multiplying this delayed sample Sdr by the value, which is obtained by inverting the sign of the constant $\mu$. Further, this extracted value is subtracted from the input sample Spp to thereby eliminate the level fluctuation component from the input sample Spp.

Incidentally, at the sampling timing other than the latter sampling timing among the timings (the times t and (t+T)) when the standard edge RE is detected, the value of the gate sample Sg is zero as shown in FIG. 12. Thus, as the value of the delayed sample Sdr at this sampling timing other than the latter sampling timing, the delayed sample Sdr is generated in which it has the same absolute value and its sign is inverted at each sampling timing. In accordance with this delayed sample Sdr, a multiplied sample Smpp is generated in which under the same value, the sign is inverted at each sampling timing, and is subtracted from the input sample Spp. Hence, the fluctuation eliminated sample Spe is generated by the repetition of the above-mentioned operations.

As for the value of the constant $\mu$ in the multiplier 29, similarly to the case of the fourth embodiment, as the value $\mu$ is smaller, the level fluctuation component can be further accurately extracted. On the other hand, if the value $\mu$ is too small, it causes the tracking speed of the fluctuation component eliminator $3'_{-5}$ to be made slower. Thus, the value $\mu$ is experimentally determined so as to obtain the sufficient accuracy and also enable the fast process.

As described above, according to the operation of the fluctuation component eliminator $3'_{-5}$ of the fifth embodiment, when the multi-level recorded digital information is reproduced, it is reproduced while the level fluctuation component included in the corresponding analog detection signal Sap is extracted and cancelled out to thereby enable the accurate reproduction of the multi-level recorded digital information.

The multi-level-recorded digital information can be optically accurately reproduced even if the positional drift of the information pit PT causes the level fluctuation component to be included in the analog detection signal Sap.

Moreover, the amplitude fluctuation of the analog detection signal Sap caused by the mixture of the level fluctuation component into the analog detection signal Sap is averaged and subtracted by using the feedback control, in accordance with the subtracted sample Ssbb generated at the sampling timing corresponding to the standard pit PT. Thus, even if the digital information recorded in a plurality of pit edges striding over a plurality of tracks are reproduced at the same time, the level fluctuation components can be accurately eliminated to thereby reproduce the digital information.

In the respective embodiments, the case has been explained in which the position of the pit edge is changed by the multiple steps in accordance with the multiple value of the digital information, and then the digital information is multi-level-recorded. However, other than this, the present invention can be applied to a multi-level recording method of changing a depth of an information pit by multiple-steps to thereby multi-level-record the digital information.

Also, the configurations of the fluctuation component eliminators $3'_{-4}$ and $3'_{-5}$ of the fourth and fifth embodiments can be used to eliminate the level fluctuation component caused by the drift when the light beam B is irradiated to only one track at a time and the digital information is reproduced and when the drift is induced in the formation position of the information pit PT on the one track TR.

The actual effect in case of using the fluctuation component eliminator $3_{-1}$ of the first embodiment among the respective embodiments will be described below with reference to FIG. 13A to FIG. 13C.

Figure 13A:
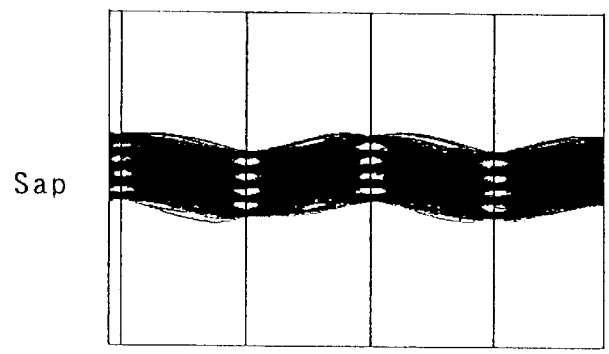
FIG. 13A is a diagram showing a waveform (I) explaining an effect of the present invention.
Figure 13B:
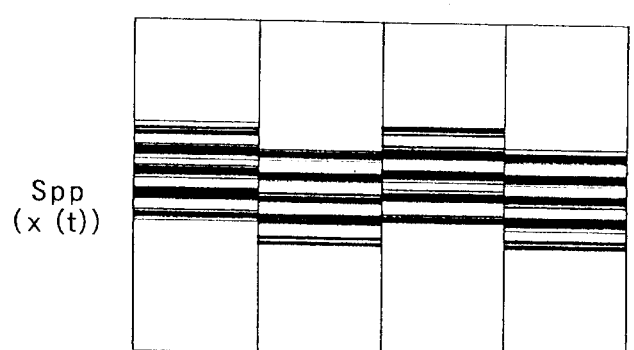
FIG. 13B is a diagram showing a waveform (II) describing an effect of the present invention.
Figure 13C:
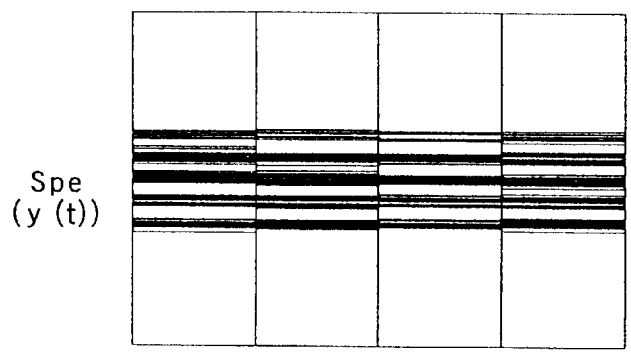
FIG. 13C is a diagram showing a waveform (III) describing an effect of the present invention.

The experiment result shown in FIG. 13A to FIG. 13C illustrates the case when the beam spot BS is formed on one track at a time to then reproduce the pit edge, and also illustrates the result of a case of performing three-value-edge modulation with the modulation degree (which corresponds to d/L when d and L in FIG. 7 are used) of 0.22.

As shown in FIG. 13A to FIG. 13C, it can be understood that, in the input sample Spp (refer to FIG. 13B) obtained by sampling the analog detection signal Sap (refer to FIG. 13A) including the level fluctuation component, after the element containing the amplitude fluctuation (undulation) is passed through the fluctuation component eliminator $3_{-1}$ of the first embodiment, the level fluctuation component is eliminated as shown in FIG. 13C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-189611 filed on Jul. 2, 1999 including the specification, claims, drawings and summary is incorporated herein by reference in its entirety.

What is claimed is:

1. An information reproducing apparatus for reproducing digital information from an information recording medium, on which the digital information is multi-level-recorded by changing a shape of an information pit in correspondence with the digital information by multiple steps, said information reproducing apparatus comprising:

a detection signal generating device for generating an analog detection signal corresponding to the information pit;

a sampling device for sampling the generated analog detection signal at a sampling cycle corresponding to a cycle, at which the information pit is formed on said information recording medium, to thereby generate a sampling detection signal;

an extracting device for extracting a level fluctuating component, which is included in the analog detection signal, out of the generated sampling detection signal;

a first subtraction signal generating device for subtracting the extracted level fluctuating component from the generated sampling detection signal, to thereby generate a first subtraction signal; and a reproducing device for reproducing the digital information on the basis of the generated first subtraction signal, wherein the digital information is multi-level-recorded on said information recording medium by changing respective positions of two edges opposite to each other of each information pit, by multiple steps in correspondence with the digital information, said detection signal generating device comprises:

an irradiating device for irradiating a reproducing light beam to reproduce the digital information onto one track, which is formed of a plurality of information pits on said information recording medium; and a light receiving device for receiving a reflection light of the reproducing light beam from each of the information pits, to thereby generate the analog detection signal, the level fluctuating component is included in the analog detection signal caused by a drift from a right angle of an angle between (i) an information recording surface, on which the information pit is formed, of said information recording medium and (ii) an optical axis of the reproducing light beam, and said reproducing device reproduces the digital information by comparing a level of the first subtraction signal with a plurality of thresholds set in advance in accordance with multiple levels in multi-level recording of the digital information.

2. An information reproducing apparatus according to claim 1, wherein said extracting device comprises:

a shift register device for sequentially delaying the generated sampling detection signal for each sampling cycle, to thereby output a delay signal respectively for each delay of one sampling cycle;

an inverting device for inverting even-numbered delay signals among delay signals outputted from said shift register device, to thereby generate inverted delay signals;

an adding device for adding (i) odd-numbered delay signals among the delay signals outputted from said shift register device and (ii) the inverted delay signals respectively to each other, to thereby generate an addition signal; and a level signal generating device for dividing a level of the addition signal by the number of delay stages in said shift register device, to thereby generate a level signal indicative of a level of the level fluctuating component, and said first subtraction signal generating device subtracts the generated level signal from the generated sampling detection signal, to thereby generate the first subtraction signal.

3. An information reproducing apparatus according to claim 2, wherein the number of delay stages in said shift register device is an even number.

4. An information reproducing apparatus according to claim 1, wherein said extracting device comprises:

an adding device for adding (i) the generated sampling detection signal and (ii) a multiplied delay signal, to thereby generate an addition signal;

a delaying device for delaying the generated addition signal by one sampling cycle, to thereby generate a delay signal;

a multiplying device for multiplying the generated delay signal by a multiplication coefficient to thereby generate and output the multiplied delay signal to said adding device; and a level signal generating device for multiplying the generated addition signal by an addition coefficient, which has a value that one is added to the multiplication coefficient, to thereby generate a level signal indicative of a level of the level fluctuating component, and said first subtraction signal generating device subtracts the generated level signal from the generated sampling detection signal, to thereby generate the first subtraction signal.

5. An information reproducing apparatus according to claim 1, wherein said extracting device comprises:

a second subtraction signal generating device for subtracting a delay signal form the generated first subtraction signal, to thereby generate a second subtraction signal;

a delaying device for delaying the generated second subtraction signal by one sampling cycle, to thereby generate and output the delay signal to said second subtraction signal generating device; and a level signal generating device for multiplying the generated second subtraction signal by a multiplication coefficient to thereby generate a level signal indicative of a level of the level fluctuating component, and said first subtraction signal generating device subtracts the generated level signal from the generated sampling detection signal, to thereby generate and output the first subtraction signal to said reproducing device and said second subtraction signal generating device.

6. An information reproducing apparatus for reproducing digital information from an information recording medium, on which the digital information is multi-level-recorded by changing a shape of an information pit in correspondence with the digital information by multiple steps, said information reproducing apparatus comprising:

a detection signal generating device for generating an analog detection signal corresponding to the information pit;

a sampling device for sampling the generated analog detection signal at a sampling cycle corresponding to a cycle, at which the information pit is formed on said information recording medium, to thereby generate a sampling detection signal;

an extracting device for extracting a level fluctuating component, which is included in the analog detection signal, out of the generated sampling detection signal;

a first subtraction signal generating device for subtracting the extracted level fluctuating component from the generated sampling detection signal, to thereby generate a first subtraction signal; and a reproducing device for reproducing the digital information on the basis of the generated first subtraction signal, wherein the digital information is multi-level-recorded on said information recording medium by changing respective positions of two edges opposite to each other of each information pit, by multiple steps in correspondence with the digital information, a plurality of information pits are formed in a zigzag shape between two tracks adjacent to each other, as for a plurality of tracks formed of the information pits on said information recording medium, said detection signal generating device comprises:

an irradiating device for irradiating a reproducing light beam to reproduce the digital information onto said information recording medium such that an irradiation range of the reproducing light beam includes a plurality of edges on the tracks adjacent to each other; and a light receiving device for receiving a reflection light of the reproducing light beam from each of the edges on the tracks, to thereby generate the analog detection signal, the level fluctuating component is included in the analog detection signal caused by a drift of a position, where each information pit is formed, from a position corresponding to the cycle by which the information pit is to be formed, and said reproducing device reproduces the digital information by comparing a level of the first subtraction signal with a plurality of thresholds set in advance in accordance with multiple levels in multi-level recording of the digital information.

7. An information reproducing apparatus according to claim 6, wherein said information recording medium comprises the information pits having standard edges, which are the edges each formed at a position corresponding to a standard level set in advance for the multiple levels and which are included simultaneously in the irradiation range, said extracting device comprises:

a second subtraction signal generating device for subtracting a delay signal form the generated first subtraction signal, which is generated at a timing when only the standard edges are included in the irradiation range, to thereby generate a second subtraction signal;

a delaying device for delaying the generated second subtraction signal by one sampling cycle, to thereby generate and output the delay signal to said second subtraction signal generating device; and a level signal generating device for multiplying the generated delay signal by a multiplication coefficient to thereby generate a level signal indicative of a level of the level fluctuating component, and said first subtraction signal generating device subtracts the generated level signal from the generated sampling detection signal, to thereby generate and output the first subtraction signal to said reproducing device and said second subtraction signal generating device.

8. An information reproducing apparatus according to claim 6, wherein said information recording medium comprises the information pits having standard edges, which are the edges each formed at a position corresponding to a standard level set in advance for the multiple levels and which are included simultaneously in the irradiation range, the standard edge is formed to be included in the irradiation range at two irradiation timings respectively corresponding to a start timing and an end timing of one sampling cycle, said extracting device comprises:

a first delaying device for delaying the first subtraction signal, which is generated at a former irradiation timing of the two irradiation timings, by one sampling cycle, to thereby generate a first delay signal;

a second subtraction signal generating device for subtracting the first delay signal from the first subtraction signal, which is generated at a latter irradiation timing of the two irradiation timings, to thereby generate a second subtraction signal;

a third subtraction signal generating device for subtracting a second delay signal form the second subtraction signal corresponding to the latter irradiation timing, to thereby generate a third subtraction signal;

a second delaying device for delaying the generated third subtraction signal by one sampling cycle, to thereby generate the second delay signal; and a level signal generating device for multiplying the generated second delay signal by a multiplication coefficient to thereby generate a level signal indicative of a level of the level fluctuating component, and said first subtraction signal generating device subtracts the generated level signal from the generated sampling detection signal, to thereby generate and output the first subtraction signal to said reproducing device, said first delaying device and said second subtraction signal generating device.

9. An information recording medium, on which digital information having multiple levels is multi-level-recorded by changing a shape of information pit by multiple steps in accordance with the digital information, wherein the information pit is shaped in a zigzag shape between two tracks adjacent to each other, each track being formed of a plurality of information pits on said information recording medium, positions of two edges opposed to each other of each information pit are respectively changed by multiple steps in correspondence with the multiple levels, the information pits have standard edges respectively, which are formed at positions corresponding to a standard level set in advance in the multiple levels and are included simultaneously in an irradiation range of a light beam to reproduce the digital information on said information recording medium, and the digital information is reproduced from said information recording medium by detecting the standard edges by using the light beam while a level fluctuating component included in an analog detection signal corresponding to the information pit is cancelled out.

* * * * *